United States Patent
Shi et al.

(10) Patent No.: US 10,951,131 B2
(45) Date of Patent: Mar. 16, 2021

(54) CONVERTER AND METHOD FOR DRIVING CONVERTER

(71) Applicant: HUAWEI TECHNOLOGIES CO., LTD., Shenzhen (CN)

(72) Inventors: Lei Shi, Shanghai (CN); Jun Zhang, Shenzhen (CN); Dianbo Fu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/719,114

(22) Filed: Dec. 18, 2019

(65) Prior Publication Data

US 2020/0127584 A1    Apr. 23, 2020

Related U.S. Application Data

(63) Continuation of application No. PCT/CN2018/083015, filed on Apr. 13, 2018.

(30) Foreign Application Priority Data

Jun. 21, 2017  (CN) .......................... 201710476781.5

(51) Int. Cl.
*H02M 7/797* (2006.01)
*H02J 3/32* (2006.01)
(Continued)

(52) U.S. Cl.
CPC .............. *H02M 7/797* (2013.01); *H02J 3/32* (2013.01); *H02J 3/381* (2013.01); *H02M 1/00* (2013.01);
(Continued)

(58) Field of Classification Search
None
See application file for complete search history.

(56) References Cited

U.S. PATENT DOCUMENTS 6,480,403 B1  11/2002 Bijlenga
8,848,405 B2   9/2014 Temesi et al.
(Continued)

FOREIGN PATENT DOCUMENTS

| CN | 101599713 A | 12/2009 |
| CN | 101707442 A | 5/2010 |

(Continued)

OTHER PUBLICATIONS

XP031825937 D. Floricau et al.,"Three-Level Active NPC Converter:PWM Strategies and Loss Distribution",dated 2008 IEEE,total 6 pages.

(Continued)

*Primary Examiner* — Jeffrey A Gblende
(74) *Attorney, Agent, or Firm* — Stein IP, LLC

(57) ABSTRACT

A switch circuit of a converter includes three switch units. A first switch unit includes a first switch device, a second switch device, a third switch device, and a fourth switch device that are connected in series. A second switch unit includes a fifth switch device and a sixth switch device that are connected in series. A third switch unit includes a seventh switch device and an eighth switch device that are connected in series. When the first switch device and the fifth switch device are switched on, the seventh switch is controlled to be switched on. When the fourth switch device and the sixth switch device are switched on, the eighth switch device is controlled to be switched on, thereby effectively reducing a conduction loss of the converter.

13 Claims, 14 Drawing Sheets

(51) Int. Cl.
*H02J 3/38* (2006.01)
*H02M 1/00* (2006.01)

(52) U.S. Cl.
CPC .. *H02J 2300/24* (2020.01); *H02M 2001/0054* (2013.01)

(56) References Cited

U.S. PATENT DOCUMENTS

| | | | |
|---|---|---|---|
| RE45,453 E * | 4/2015 | Bremicker | H02M 7/515 363/132 |
| 9,413,268 B2 * | 8/2016 | Fu | H02J 3/383 |
| 10,084,391 B2 * | 9/2018 | Xu | H02M 7/48 |
| 10,177,683 B2 * | 1/2019 | Shi | H02M 7/5387 |
| 2003/0043603 A1 | 3/2003 | Schreiber | |
| 2011/0193412 A1 | 8/2011 | Lacarnoy | |
| 2012/0033474 A1 | 2/2012 | Temesi et al. | |
| 2013/0154716 A1 | 6/2013 | Degener et al. | |
| 2015/0155770 A1 | 6/2015 | Ying et al. | |

FOREIGN PATENT DOCUMENTS

| | | |
|---|---|---|
| CN | 102148583 A | 8/2011 |
| CN | 102611342 A | 7/2012 |
| CN | 103354427 A | 10/2013 |
| CN | 103856095 A | 6/2014 |
| CN | 104578863 A | 4/2015 |
| CN | 102347702 B | 6/2015 |
| CN | 104682736 A | 6/2015 |
| CN | 204517692 U | 7/2015 |
| CN | 106655848 A | 5/2017 |
| DE | 202016106881 U1 | 12/2016 |
| EP | 2413489 B1 | 9/2013 |
| EP | 2662968 A1 | 11/2013 |
| EP | 2728734 A1 | 5/2014 |
| EP | 2846453 B1 | 8/2018 |

OTHER PUBLICATIONS

M. Schweizer,:"Design and Implementation of a Highly Efficient Three-Level T-Type Converter for Low-VoltageApplications",Feb. 2013,total 10 pages.
Akira Nabae, et al:"A New Neutral-Point-Clamped PWM Inverter",1981,total 6 pages.
J.P. Lyons. V. Vlatkovic et al:"Innovation IGCT Main Drives",1999,total 7 pages.
J P Ballad et al:"Interference Immunity Tests of an HVDC Valve Section Consisting of Two Thyristor Levels.",1993,total 6 pages.
R. Sommer,et al:"New Medium Voltage Drive Systems using Three-Level Neutral Point Clamped Inverter with High Voltage IGBT",1999,total 7 pages.
Steffen Bernet, et al:"Recent Developments of High Power Converters forIndustry and Traction Applications",2000,total 16 pages.
Tadros, Y.;et al:Three Level IGBT I.Nverter,1992,total 7 pages.

* cited by examiner

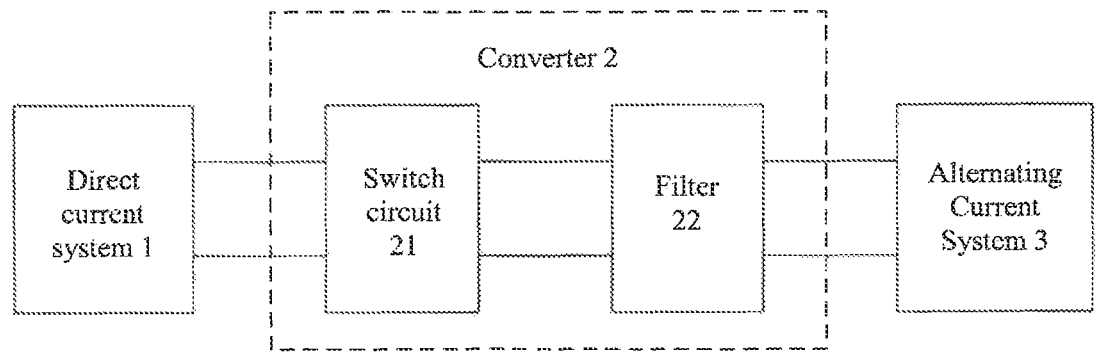
FIG. 1 --PRIOR ART--
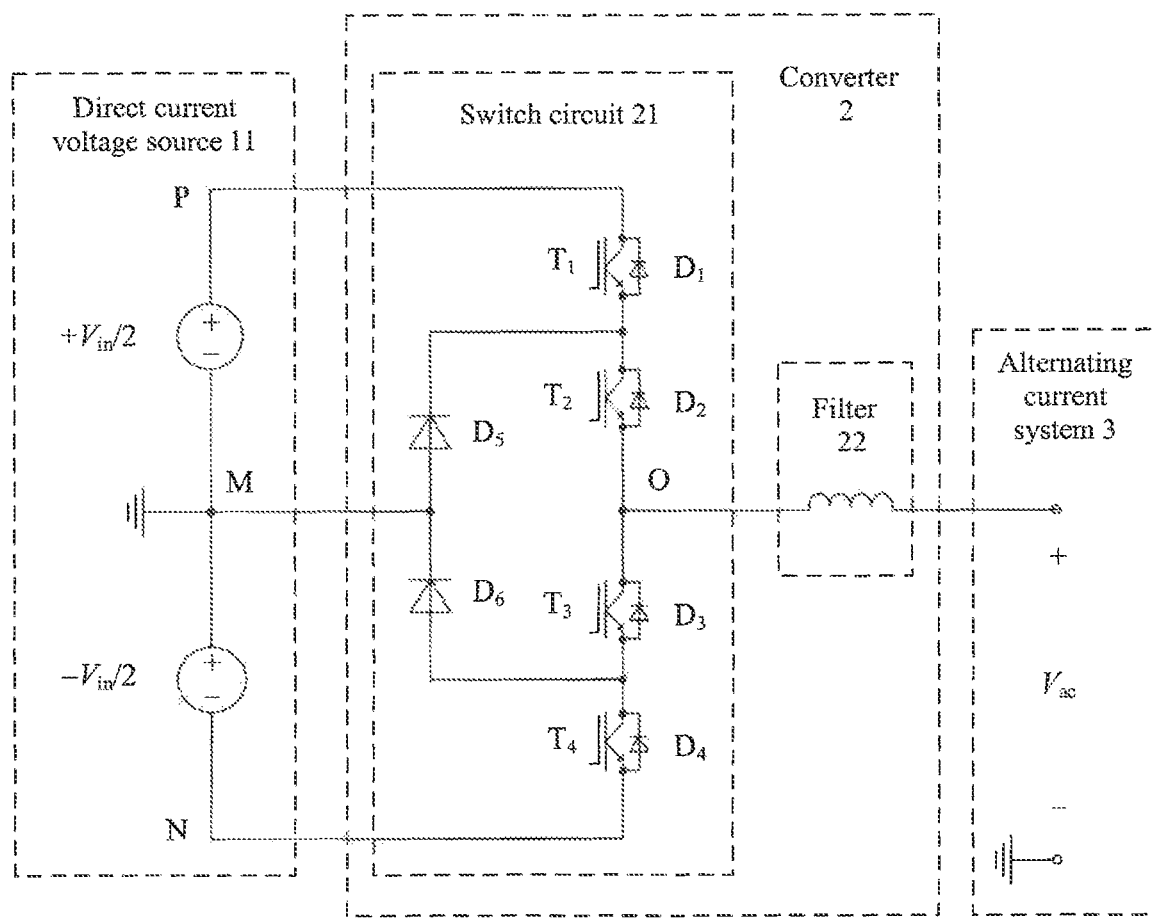
FIG. 2 --PRIOR ART--

In a first drive phase, switch on a first switch device S1 and a third switch device S3 in a first switch unit SU1; switch off a second switch device S2 and a fourth switch device S4 in the first switch unit SU1; switch on and switch off each of a fifth switch device S5 and a sixth switch device S6 in a second switch unit SU2 at a high frequency, and alternately switch on the fifth switch device S5 and the sixth switch device S6; switch on and switch off a seventh switch device S7 in a third switch unit SU3 at a preset frequency; and switch off an eighth switch device S8 in the third switch unit SU3, where in at least one switch-on period of the fifth switch device S5, the seventh switch device S7 and the fifth switch device S5 are switched on at the same time, or the seventh switch device S7 is switched on after a preset time period of delay, and the seventh switch device S7 is switched off before the fifth switch device S5 is switched off; when the fifth switch device S5 is switched on, a first end P of a direct current voltage source 11 is connected to an input end of a filter 12; and when the sixth switch device S6 is switched on, a third end M of the direct current voltage source 11 is connected to the input end of the filter 12 — 101

In a second drive phase, switch off the first switch device S1 and the third switch device S3 in the first switch unit SU1; switch on the second switch device S2 and the fourth switch device S4 in the first switch unit SU1; switch on and switch off the fifth switch device S5 and the sixth switch device S6 in the second switch unit SU2 at the high frequency, and alternately switch on the fifth switch device S5 and the sixth switch device S6; switch on and switch off the eighth switch device S8 in the third switch unit SU3 at the preset frequency; and switch off the seventh switch device S7 in the third switch unit SU3, where in at least one switch-on period of the sixth switch device S6, the eighth switch device S8 and the sixth switch device S6 are switched on at the same time, or the eighth switch device S8 is switched on after a preset time period of delay, and the eighth switch device S8 is switched off before the sixth switch device S6 is switched off; when the sixth switch device S6 is switched on, a second end N of the direct current voltage source 11 is connected to the input end of the filter 12; and when the fifth switch device S5 is switched on, the third end M of the direct current voltage source 11 is connected to the input end of the filter 12 — 102

FIG. 7

CONVERTER AND METHOD FOR DRIVING CONVERTER

CROSS-REFERENCE TO RELATED APPLICATION

This application is a continuation Application of International Patent application No. PCT/CN2018/083015, filed on Apr. 13, 2018, which claims priority to Chinese Patent Application No. 201710476781.5, filed on Jun. 21, 2017. The disclosures of the aforementioned applications are hereby incorporated by reference in their entireties.

TECHNICAL FIELD

Aspects of this application relates to the field of power electronic technologies, and in particular, to a converter and a method for driving the converter.

BACKGROUND

A converter is a device used for conversion between a direct current voltage and an alternating current voltage. Referring to FIG. 1, a converter 2 mainly includes a switch circuit 21 and a filter 22. The switch circuit 21 is constituted by semiconductor switch devices, and is configured to convert a direct current voltage provided by a direct current system 1 into a pulse signal. The filter 22 is configured to convert the pulse signal into a sinusoidal alternating current signal whose frequency is a power frequency, and output the sinusoidal alternating current signal to an alternating current system 3. The power frequency is a frequency of an alternating current power supply used in industry, and is usually 50 hertz (Hz) or 60 Hz.

In a related technology, a commonly used converter is usually shown in FIG. 2. A direct current voltage source 11 in the direct current system connected to the converter 2 usually includes two voltage sources that are connected in series. The two voltage sources are respectively configured to provide a positive level of $+V_{in}/2$ and a negative level of $-V_{in}/2$. A connection point M between the two voltage sources may provide a zero level. The switch circuit 21 of the converter 2 includes four insulated gate bipolar transistors (IGBT) $T_1$, $T_2$, $T_3$, and $T_4$ that are connected in series, and two diodes $D_5$ and $D_6$ that are connected in series. Each of the four IGBTs is anti-parallel to a diode (in FIG. 2, four diodes respectively anti-parallel to the four IGBTs one by one are $D_1$ to $D_4$). Two ends of the four IGBTs that are connected in series are respectively connected to a positive output end P and a negative output end N of the direct current voltage source, a connection point O between the IGBT $T_2$ and the IGBT $T_3$ is connected to an input end of the filter 22, a connection point between the IGBTs $T_1$ and $T_2$ is connected to a cathode of the diode $D_5$, a connection point between the IGBT $T_3$ and the IGBT $T_4$ is connected to an anode of the diode $D_6$, and a connection point between the diodes $D_5$ and $D_6$ is connected to the connection point M. A frequency (namely a switching frequency) at which each IGBT is switched on and switched off in a working process is usually hundreds to thousands of times the power frequency, that is, usually a high frequency. When $T_1$ and $T_2$ are switched on, the connection point O is connected to the positive output end P of the direct current voltage source, and the switch circuit outputs a positive level of $\pm V_{in}/2$ to the filter 022. When $T_3$ and $T_4$ are switched on, the connection point O is connected to the negative output end N of the direct current voltage source, and the switch circuit outputs a negative level of $-V_{in}/2$ to the filter 22. When $D_5$ and $T_2$ are switched on or $T_3$ and $D_6$ are switched on, the connection point O is connected to the connection point M, and the switch circuit outputs a zero level to the filter 22.

In the converter in the related technology, when $T_1$ and $T_2$ are switched on or $T_3$ and $T_4$ are switched on, a switch-on voltage drop between the output end of the direct current voltage source and the connection point O is a sum of voltage drops of two IGBTs, and the switch-on voltage drop is relatively large. Consequently, a conduction loss of the converter is relatively large.

SUMMARY

Aspects of this application provide a converter and a method for driving the converter, to resolve a problem that a switching loss of a converter in a related technology is relatively large. Some technical solutions are as follows.

According to a first aspect, a converter is provided, and the converter includes a switch circuit and a filter. The switch circuit includes a first switch unit, a second switch unit, and a third switch unit.

A first end of the first switch unit is connected to a first end of a direct current voltage source, a second end of the first switch unit is connected to a second end of the direct current voltage source, and a third end of the first switch unit is connected to a third end of the direct current voltage source. The first switch unit includes four switch devices that are sequentially connected in series: a first switch device, a second switch device, a third switch device, and a fourth switch device. A first end of the first switch device is the first end of the first switch unit, a second end of the fourth switch device is the second end of the first switch unit, and a connection point between the second switch device and the third switch device is the third end of the first switch unit. The first end, the second end, and the third end of the direct current voltage source are respectively configured to provide a positive level, a negative level, and a zero level.

A first end of the second switch unit is connected to a first connection point, and the first connection point is a connection point between the first switch device and the second switch device. A second end of the second switch unit is connected to a second connection point, and the second connection point is a connection point between the third switch device and the fourth switch device, A third end of the second switch unit is connected to an input end of the filter. The second switch unit includes a fifth switch device and a sixth switch device that are connected in series. A first end of the fifth switch device is the first end of the second switch unit, a second end of the sixth switch device is the second end of the second switch unit, and a connection point between the fifth switch device and the sixth switch device is the third end of the second switch unit.

A first end of the third switch unit is connected to the first end of the direct current voltage source, a second end of the third switch unit is connected to the second end of the direct current voltage source, and a third end of the third switch unit is connected to the input end of the filter. The third switch unit includes a seventh switch device and an eighth switch device that are connected in series. A first end of the seventh switch device is the first end of the third switch unit, a second end of the eighth switch device is the second end of the third switch unit, and a connection point between the seventh switch device and the eighth switch device is the third end of the third switch unit.

A switching frequency of each switch device in the first switch unit is a power frequency, and a switching frequency of each switch device in the second switch unit is a high frequency. A switching frequency of the seventh switch device is a preset frequency in a switch-on phase of the first switch device, and the seventh switch device is in a switch-off state in a switch-off phase of the first switch device. A switching frequency of the eighth switch device is the preset frequency in a switch-on phase of the second switch device, and the eighth switch device is in a switch-off state in a switch-off phase of the second switch device.

In an actual working process of the converter provided in this embodiment of the present disclosure, when the first switch device and the fifth switch device are switched on, that is, the input end of the filter is connected to the first end of the direct current voltage source, the seventh switch device S7 may be controlled to be switched on. When the fourth switch device and the sixth switch device are switched on, that is, the input end of the filter is connected to the second end of the direct current voltage source, the eighth switch device may be controlled to be switched on. In this way, a switch-on voltage drop between the input end of the filter and each of two output ends of the direct current voltage source may be a voltage drop of only one switch device, and the switch-on voltage drop is relatively small, thereby effectively reducing a conduction loss of the converter.

In a first executable implementation, each of the first switch device to the eighth switch device may include an IGBT and a diode anti-parallel to the IGBT.

In a second executable implementation, each of the first switch device to the sixth switch device includes an IGBT and a diode anti-parallel to the IGBT, and the seventh switch device includes an IGBT, and the eighth switch device includes an IGBT. Compared with the first executable implementation, anti-parallel diodes in the seventh switch device and the eighth switch device are omitted, the switch circuit may work normally, and costs of the switch devices may be reduced.

In a third executable implementation, the first switch device includes an IGBT, the fourth switch device includes an IGBT, and each of switch devices other than the first switch device and the fourth switch device in the converter includes an IGBT and a diode anti-parallel to the IGBT. Anti-parallel diodes in the first switch device and the fourth switch device are omitted, the switch circuit may work normally, and costs of the switch devices may be reduced.

In a fourth executable implementation, each of the first switch device to the eighth switch device includes a plurality of IGBTs that are connected in series, and each IGBT is anti-parallel to a diode. A plurality of IGBTs or diodes that are connected in series are used, such that switch devices with a relatively low withstand voltage may be applied to a high-voltage application scenario, and devices with a same withstand voltage may be used as the switch devices.

In a fifth executable implementation, each of the first switch device to the sixth switch device includes an IGBT and a diode anti-parallel to the IGBT. Each of the seventh switch device and the eighth switch device may include a metal oxide semiconductor field effect transistor (MOSFET) and a diode that are connected in series; or each of the seventh switch device and the eighth switch device may include a wide bandgap device and a diode that are connected in series; or each of the seventh switch device and the eighth switch device may include only one wide bandgap device. The wide bandgap device may include a gallium nitride (GaN) device or a silicon carbide (SiC) device.

In a sixth executable implementation, each of the first switch device and the fourth switch device includes a MOSFET and a diode that are connected in series; or each of the first switch device and the fourth switch device may include a wide bandgap device and a diode that are connected in series; or each of the first switch device and the fourth switch device may include only one wide bandgap device; and each of switch devices other than the first switch device and the fourth switch device in the converter includes an IGBT and a diode anti-parallel to the IGBT.

In a low-power application scenario, switch-on voltage drops of the MOSFET and the wide bandgap device each are lower than a switch-on voltage drop of the IGBT. Therefore, selecting an appropriate MOSFET or wide bandgap device may further reduce a conduction loss. In addition, because a switch device loss is relatively large when a parasitic body diode of the MOSFET is switched off, connecting the MOSFET and the parasitic diode in series can prevent a positive level from being output and prevent a current from flowing through the parasitic body diode of the MOSFET when the current flows from a direct current side to an alternating current side.

Optionally; the switching frequency of each switch device in the first switch unit is the power frequency, the switching frequency of the switch device is relatively low, and a switching loss of the switch device is also relatively low. In addition, each switch device in the third switch unit may be switched on or switched off at a low voltage or even a zero voltage, a switching oss of the switch device may be ignored. Therefore, a device whose saturation voltage drop is less than a preset voltage drop threshold may be selected as each switch device in the first switch unit and the third switch unit, that is, a device whose switch-on voltage drop is relatively low may be selected. However, the switching frequency of each switch device in the second switch unit is relatively high. Therefore, a device whose switching loss is less than a preset loss threshold may be selected, that is, a device with a relatively low switching loss may be selected. In this way, it can be ensured that a conduction loss and a switching loss of the entire switch circuit both are relatively low.

Optionally, to ensure normal working of the converter, a withstand voltage of each switch device in the first switch unit and the second switch unit should be not less than half of a direct current voltage provided by the direct current voltage source, and a withstand voltage of each switch device in the third switch unit should be not less than the direct current voltage.

Optionally, the converter may further include a control module. The control module is connected to a control end of each switch device and is configured to output a drive signal to each switch device.

Optionally, a frequency of a drive signal output by the control module to each switch device in the first switch unit is the power frequency, and each power frequency period includes a first drive phase and a second drive phase.

In the first drive phase, a level of a first drive signal output by the control module to the first switch device and a level of a third drive signal output to the third switch device each are a first level; a level of a second drive signal output by the control module to the second switch device and a level of a fourth drive signal output to the fourth switch device each are a second level; a frequency of a fifth drive signal output by the control module to the fifth switch device and a frequency of a sixth drive signal output to the sixth switch device each are the high frequency, and the fifth drive signal and the sixth drive signal are complementary to each other; a frequency of a seventh drive signal output by the control module to the seventh switch device is the preset frequency;

and a level of an eighth drive signal output to the eighth switch device is the second level. In at least one high frequency period, when the fifth drive signal jumps from the second level to the first level, the seventh drive signal jumps from the second level to the first level at the same time or jumps from the second level to the first level after a preset time period of delay, and the seventh drive signal jumps from the first level to the second level before the fifth drive signal jumps from the first level to the second level.

In the second drive phase, the level of the first drive signal and the level of the third drive signal each are the second level; the level of the second drive signal and the level of the fourth drive signal each are the first level; the frequency of the fifth drive signal and the frequency of the sixth drive signal each are the high frequency; and the fifth drive signal and the sixth drive signal are complementary to each other; the level of the seventh drive signal is the second level; and a frequency of the eighth drive signal is the preset frequency. In at least one high frequency period, when the sixth drive signal jumps from the second level to the first level, the eighth drive signal jumps from the second level to the first level at the same time or jumps from the second level to the first level after a preset time period of delay, and the eighth drive signal jumps from the first level to the second level before the sixth drive signal jumps from the first level to the second level. The preset frequency may be the high frequency, the power frequency, or a frequency between the high frequency and the power frequency.

According to a second aspect, a method for driving a converter is provided. The method is configured to drive the converter provided in the first aspect, and the method may include:

in a first drive phase, switching on the first switch device and the third switch device in the first switch unit; switching off the second switch device and the fourth switch device in the first switch unit; switching on and switching off each of the fifth switch device and the sixth switch device in the second switch unit at a high frequency, and alternately switching on the fifth switch device and the sixth switch device; switching on and switching off the seventh switch device in the third switch unit at a preset frequency; and switching off the eighth switch device in the third switch unit, where in at least one switch-on period of the fifth switch device, the seventh switch device and the fifth switch device are switched on at the same time, or the seventh switch device is switched on after a preset time period of delay, and the seventh switch device is switched off before the fifth switch device is switched off; when the fifth switch device is switched on, the first end of the direct current voltage source is connected to the input end of the filter; and when the sixth switch device is switched on, the third end of the direct current voltage source is connected to the input end of the filter; and in a second drive phase, switching off the first switch device and the third switch device in the first switch unit; switching on the second switch device and the fourth switch device in the first switch unit; switching on and switching off the fifth switch device and the sixth switch device in the second switch unit at the high frequency, and alternately switching on the fifth switch device and the sixth switch device; switching on and switching off the eighth switch device in the third switch unit at the preset frequency; and switching off the seventh switch device in the third switch unit, where in at least one switch-on period of the sixth switch device, the eighth switch device and the sixth switch device are switched on at the same time, or the eighth switch device is switched on after a preset time period of delay, and the eighth switch device is switched off before the sixth switch device is switched off; when the sixth switch device is switched on, the second end of the direct current voltage source is connected to the input end of the filter; and when the fifth switch device is switched on, the third end of the direct current voltage source is connected to the input end of the filter. The preset frequency may be the high frequency, the power frequency, or a frequency between the high frequency and the power frequency.

In the driving method provided in this embodiment of the present disclosure, the seventh switch device and the eighth switch device are respectively controlled to be switched on after a delay relative to the fifth switch device and the sixth switch device, and to be switched off in advance relative to the fifth switch device and the sixth switch device, such that the seventh switch device and the eighth switch device can be switched on or switched off at a low voltage or even a zero voltage, thereby effectively reducing a switching loss of the switch circuit.

Optionally, each of the first switch device to the eighth switch device includes an IGBT and a diode anti-parallel to the IGBT.

In the first drive phase, the IGBTs in the first switch device and the third switch device are switched on; when the IGBTs in the fifth switch device and the seventh switch device both are switched on, the first end of the direct current voltage source is connected to the input end of the filter using the seventh switch device; and when the IGBT in the sixth switch device is switched on, the third end of the direct current voltage source is connected to the input end of the filter.

In the second drive phase, the IGBTs in the second switch device and the fourth switch device are switched on; when the IGBTs in the sixth switch device and the eighth switch device both are switched on, the second end of the direct current voltage source is connected to the input end of the filter using the eighth switch device; and when the IGBT in the fifth switch device is switched on, the third end of the direct current voltage source is connected to the input end of the filter.

According to a third aspect, a computer readable storage medium is provided, and the computer readable storage medium stores an instruction. When the computer readable storage medium runs on a computer, the computer is enabled to perform the method for driving a converter provided in the second aspect.

According to a fourth aspect, a computer program product including an instruction is provided. When the computer program product runs on a computer, the computer is enabled to perform the method for driving a converter provided in the second aspect.

The technical solutions provided in the embodiments of the present disclosure bring the following beneficial effects:

The embodiments of the present disclosure provide the converter and the method for driving the converter. The switch circuit of the converter includes three switch units. The first switch unit includes four switch devices that are sequentially connected in series: the first switch device, the second switch device, the third switch device, and the fourth switch device. The second switch unit includes the fifth switch device and the sixth switch device that are connected in series. The third switch unit includes the seventh switch device and the eighth switch device that are connected in series. In an actual driving process, when the first switch device and the fifth switch device are switched on, that is, the output end of the switch circuit is connected to the first end of the direct current voltage source, the seventh switch may be controlled to be switched on. When the fourth switch device and the sixth switch device are switched on, that is, the output end of the switch circuit is connected to the second end of the direct current voltage source, the eighth switch device may be controlled to be switched on. In this way; a switch-on voltage drop between the output end of the switch circuit and each of two output ends of the direct current voltage source may be a voltage drop of only one switch device, and the switch-on voltage drop is relatively small, thereby effectively reducing the conduction loss of the converter. In addition, in the switch circuit, the switching frequency of the switch device in only the second switch unit is the high frequency; and a quantity of high-frequency switch devices is relatively small, such that a switching loss of the converter is also relatively low.

BRIEF DESCRIPTION OF DRAWINGS

FIG. 1 is a schematic diagram of an application scenario of a converter in the prior art;

FIG. 2 is a schematic structural diagram of a converter in the prior art;

FIG. 7 is a flowchart of a method for driving a converter according to an embodiment of the present disclosure;

DESCRIPTION OF EMBODIMENTS

To make the objectives, technical solutions, and advantages of this application clearer, the following further describes the implementations of this application in detail with reference to the accompanying drawings.

A converter provided in the embodiments of the present disclosure may be applied to an electric energy application scenario in which a direct current voltage and an alternating current voltage needs to be converted into each other, for example, may be applied to a high voltage direct current transmission (HVDC) system, an uninterruptible power supply (UPS) system, or a new energy grid-tied PV power generating system.

Figure 3:
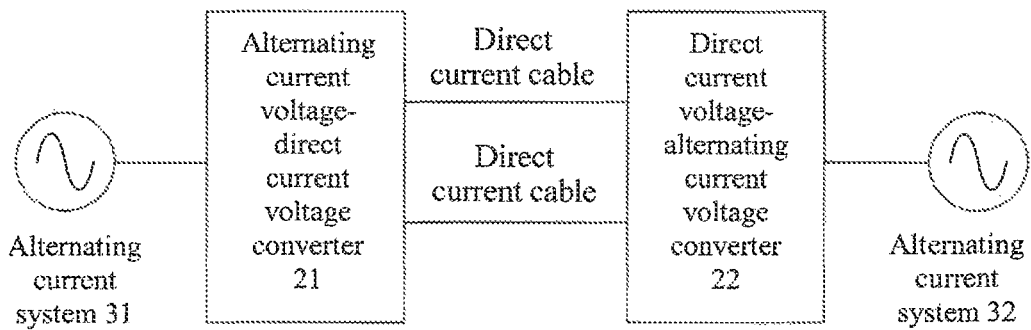
FIG. 3 is an architectural diagram of a high voltage direct current transmission (HVDC) system according to an embodiment of the present disclosure.

FIG. 3 is an architectural diagram of an HVDC system according to an embodiment of the present disclosure. As shown in FIG. 3, a converter 21 may convert an alternating current voltage output by an alternating current system 31 into a direct current voltage. For the direct current voltage, electricity is transmitted through a direct current cable. On a side of an alternating current system 32, a converter 22 may convert the direct current voltage into an alternating current voltage again.

Figure 4:
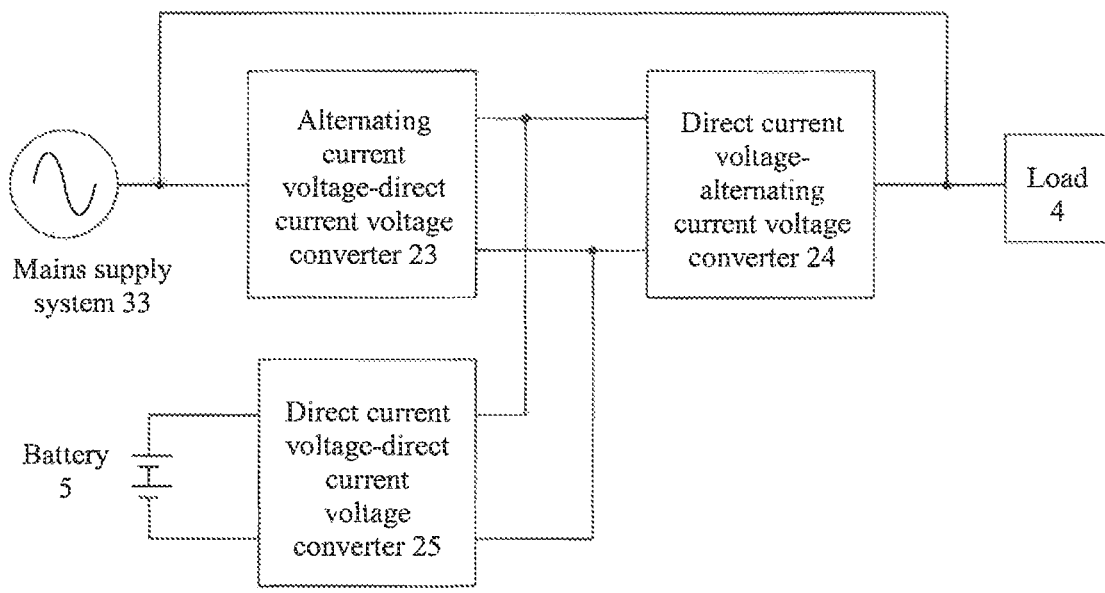
FIG. 4 is an architectural diagram of an uninterruptible power supply (UPS) system according to an embodiment of the present disclosure.

FIG. 4 is an architectural diagram of a UPS system according to an embodiment of the present disclosure. Referring to FIG. 4, in a normal electricity supply case, a mains supply system 33 may directly supply electricity to a load 04, and power-frequency alternating current mains electricity may be converted into a direct current voltage using a converter 23, and charge a battery 5 using a direct current voltage-direct current voltage converter 25. When the mains supply system 33 is faulty, a direct current voltage provided by the battery 5 is converted into an alternating current voltage after passing through the converter 25 and the converter 24, and the battery 5 supplies electricity to the load 4.

Figure 5:
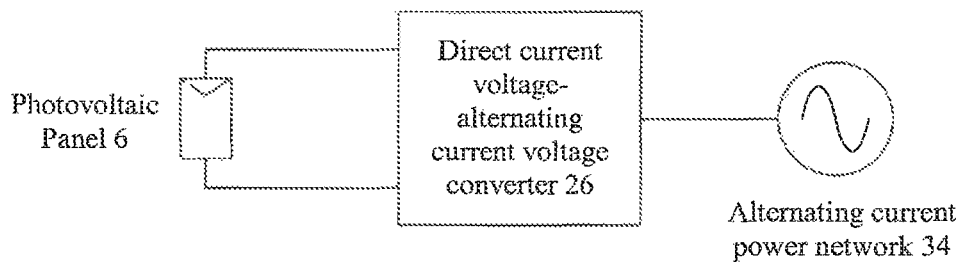
FIG. 5 is an architectural diagram of a new energy grid-tied photovoltaic (PV) power generating system according to an embodiment of the present disclosure.

FIG. 5 is an architectural diagram of a new energy grid-tied PV power generating system according to an embodiment of the present disclosure. It may be learned from FIG. 5 that a direct current voltage output by a photovoltaic panel 6 is converted into an alternating current voltage after passing through a converter 26, to transmit electric energy to an alternating current power network 34.

Figure 6:
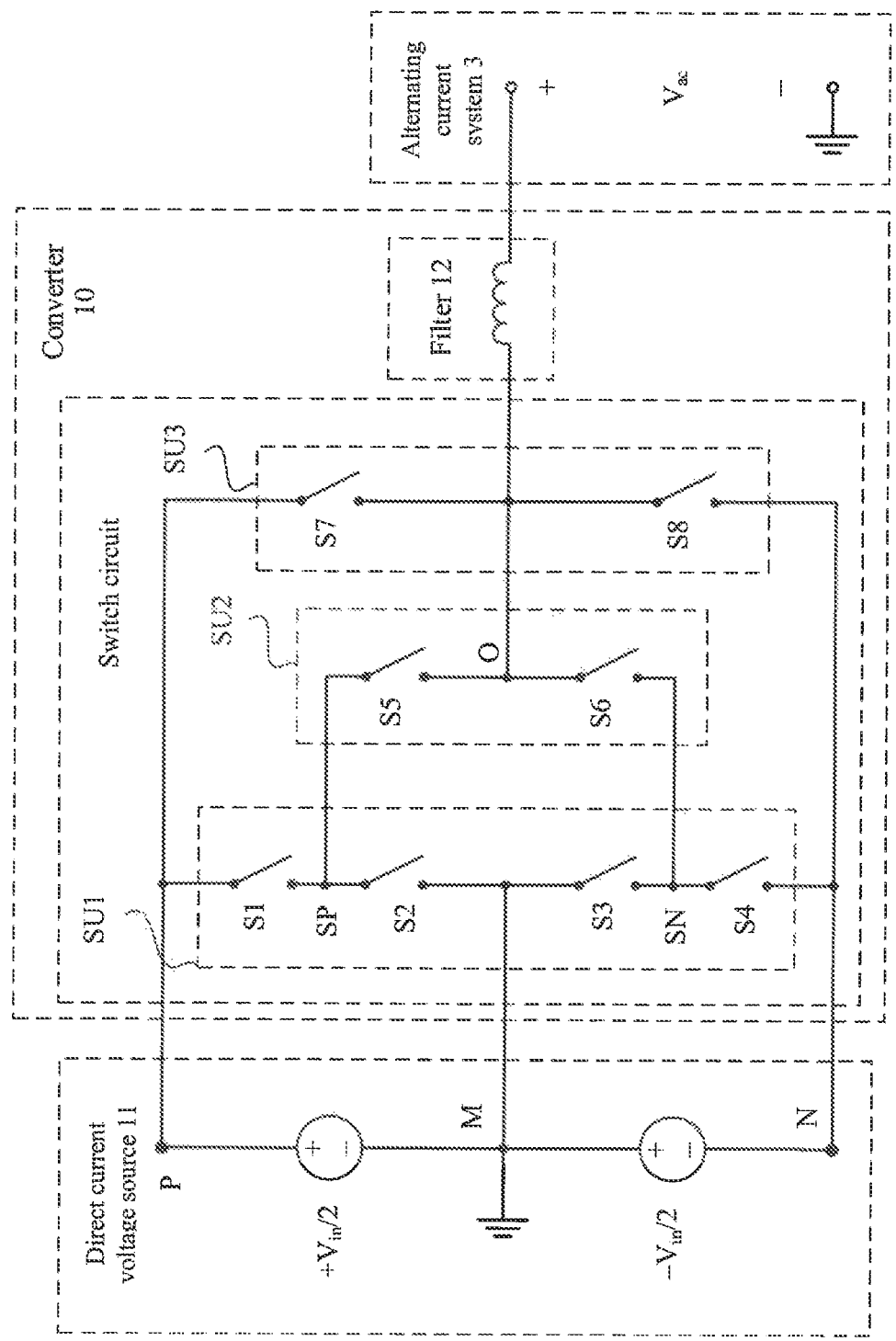
FIG. 6 is a schematic structural diagram of a converter according to an embodiment of the present disclosure.

FIG. 6 is a schematic structural diagram of a converter according to an embodiment of the present disclosure. The converter may be applied to the system shown in any one of FIG. 3 to FIG. 5. Referring to FIG. 6, a converter 10 may include a switch circuit 21 and a filter 12. The switch circuit 21 includes a first switch unit SU1, a second switch unit 5112, and a third switch unit SU3.

A first end of the first switch unit SU1 is connected to a first end P of a direct current voltage source 11, a second end of the first switch unit SU1 is connected to a second end N of the direct current voltage source 11, and a third end of the first switch unit SU1 is connected to a third end M of the direct current voltage source 11. The first switch unit SU1 may include four switch devices that are sequentially connected in series: a first switch device S1, a second switch device S2, a third switch device S3, and a fourth switch device S4. A first end of the first switch device S1 is the first end of the first switch unit SU1, a second end of the first switch device S1 is connected to the second switch device S2, a second end of the fourth switch device S4 is the second end of the first switch unit SU1, a first end of the fourth switch device S4 is connected to the third switch device S3, and a connection point between the second switch device S2 and the third switch device S3 is the third end of the first switch unit SU1.

It may be learned from FIG. 6 that the direct current voltage source 11 may include two voltage sources that are connected in series. The two voltage sources are respectively configured to provide a positive level of $++V_{in}/2$ and a negative level of $-V_{in}/2$. A positive electrode of the voltage source that is configured to provide the positive level is the first end P of the direct current voltage source 11, a negative electrode of the voltage source that is configured to provide the negative level is the second end N of the direct current voltage source 11, and an intermediate node between the two voltage sources that are connected in series is the third end M of the direct current voltage source 11. It may be learned from FIG. 6 that the first end P of the direct current voltage source 11 can provide the positive level, the second end N can provide the negative level, and the third end M can provide a zero level. Certainly, the direct current voltage source 11 may include a voltage source and two capacitors that are connected in series between positive and negative electrodes of the voltage source. The two capacitors may divide voltages of the voltage source, such that the direct current voltage source 11 can provide three levels: a positive level, a negative level, and a zero level.

Further, as shown in FIG. 6, a first end of the second switch unit SU2 is connected to a first connection point SP, and the first connection point SP is a connection point between the first switch device S1 and the second switch device S2. A second end of the second switch unit SU2 is connected to a second connection point SN, and the second connection point SN is a connection point between the third switch device S3 and the fourth switch device S4. A third end of the second switch unit SU2 is connected to an input end O of the filter 12, and the input end O of the filter 12 is an output end of the switch circuit 21. The second switch unit SU2 may include a fifth switch device S5 and a sixth switch device S6 that are connected in series. A first end of the fifth swath device S5 is the first end of the second switch unit SU2, a second end of the fifth switch device S5 is connected to a first end of the sixth switch device S6, a second end of the sixth switch device S6 is the second end of the second switch unit SU2, and a connection point between the fifth switch device S5 and the sixth switch device S6 is the third end of the second switch unit SU2.

A first end of the third switch unit SW is connected to the first end P of the direct current voltage source 11, a second end of the third switch unit SU3 is connected to the second end N of the direct current voltage source 11, and a third end of the third switch unit SU3 is connected to the input end O of the filter 12, The third switch unit SU3 may include a seventh switch device S7 and an eighth switch device S8 that are connected in series. A first end of the seventh switch device S7 is the first end of the third switch unit SU3, a second end of the seventh switch device S7 is connected to a first end of the eighth switch device S8, a second end of the eighth switch device S8 is the second end of the third switch unit SU3, and a connection point between the seventh switch device S7 and the eighth switch device S8 is the third end of the third switch unit SU3.

In this embodiment of the present disclosure, a switching frequency of each switch device in the first switch unit SU1 is a power frequency, and a switching frequency of each switch device in the second switch unit SU2 is a high frequency A switching frequency of the seventh switch device S7 is a preset frequency in a switch-on phase of the first switch device S1, and the seventh switch device is in a switch-off state in a switch-off phase of the first switch device S1. A switching frequency of the eighth switch device S8 is the preset frequency in a switch-on phase of the second switch device S2, and the eighth switch device is in a switch-off state in a switch-off phase of the second switch device S2. The power frequency may be 50 Hz or 60 Hz, the high frequency may range from 10 kilohertz (kHz) to 100 kHz, and the preset frequency may be the power frequency, the high frequency, or a frequency between the power frequency and the high frequency.

It should be noted that the converter provided in this embodiment of the present disclosure may further include a control module. The control module is connected to a control end of each switch device and is configured to output a drive signal to each switch device. The drive signal may be used to control switch-on or switch-off of each switch device. Therefore, a frequency of the drive signal is a switching frequency of each switch device.

A frequency of a drive signal output by the control module to each switch device in the first switch unit is the power frequency, and each power frequency period may be divided into a first drive phase and a second drive phase.

In the first drive phase, a level of a first drive signal output by the control module to the first switch device S1 and a level of a third drive signal output to the third switch device S3 each are a first level; a level of a second drive signal output by the control module to the second switch device S2 and a level of a fourth drive signal output to the fourth switch device S4 each are a second level; a frequency of a fifth drive signal output by the control module to the fifth switch device S5 and a frequency of a sixth drive signal output to the sixth switch device S6 each are the high frequency, and the fifth drive signal and the sixth drive signal are complementary to each other; a frequency of a seventh drive signal output by the control module to the seventh switch device S7 is the preset frequency; and a level of an eighth drive signal output to the eighth switch device S8 is the second level. In at least one high frequency period, when the fifth drive signal jumps from the second level to the first level, the seventh drive signal jumps from the second level to the first level at the same time or jumps from the second level to the first level after a preset time period of delay, and the seventh drive signal jumps from the first level to the second level before the fifth drive signal jumps from the first level to the second level.

In the second drive phase, the level of the first drive signal and the level of the third drive signal each are the second level; the level of the second drive signal and the level of the fourth drive signal each are the first level; the frequency of the fifth drive signal and the frequency of the sixth drive signal each are the high frequency, and the fifth drive signal and the sixth drive signal are complementary to each other; the level of the seventh drive signal is the second level; and a frequency of the eighth drive signal is the preset frequency. In at least one high frequency period, when the sixth drive signal jumps from the second level to the first level, the eighth drive signal jumps from the second level to the first level at the same time or jumps from the second level to the first level after a preset time period of delay, and the eighth drive signal jumps from the first level to the second level before the sixth drive signal jumps from the first level to the second level.

The first level is an effective level of a drive signal. To be specific, when a level of a drive signal input to a switch device is the first level, the switch device is switched on; and when the level of the drive sisal is the second level, the switch device is switched off. For example, the first level may be a high level relative to the second level.

In conclusion, in an actual working process of the converter provided in this embodiment of the present disclosure, when the first switch device S1 and the fifth switch device S5 are switched on, that is, the output end O of the switch circuit 21 is connected to the first end P of the direct current voltage source 11, the seventh switch device S7 may be controlled to be switched on. When the fourth switch device S4 and the sixth switch device S6 are switched on, that is, the output end O of the switch circuit 21 is connected to the second end N of the direct current voltage source 11, the eighth switch device S8 may be controlled to be switched on. In this way, a switch-on voltage drop between the output end of the switch circuit 21 and each of the two ends of the direct current voltage source 11 may be a voltage drop of only one switch device, and the switch-on voltage drop is relatively small, thereby effectively reducing a conduction loss of the converter.

Further, in this embodiment of the present disclosure, referring to FIG. 6, it may be learned that a direct current voltage input by the direct current voltage source 11 to the switch circuit 21 is $V_{in}$. When the first end P of the direct current voltage source 11 is connected to the output end O of the switch circuit 21, the first switch device S1 and the fifth switch device S5 need to be switched on at the same time, or the seventh switch device S7 needs to be switched on. When the second end N of the direct current voltage source 11 is connected to the output end O of the switch circuit 21, the third switch device S3 and the sixth switch device S6 need to be switched on at the same time, or the eighth switch device S8 needs to be switched on. When the third end M of the direct current voltage source 11 is connected to the output end O of the switch circuit 21, the second switch device S2 and the fifth switch device S5 need to be switched on at the same time, or the third switch device S3 and the sixth switch device S6 need to be switched on at the same time. Therefore, a withstand voltage of each switch device namely, S1 to S6) in the first switch unit SU1 and the second switch unit SU2 should not be less than half of the direct current voltage, that is, not less than $V_{in}/2$; and a withstand voltage of each switch device (namely, S7 and S8) in the third switch unit SU3 should not be less than the direct current voltage $V_{in}$.

For example, assuming that a maximum direct current voltage input by the direct current voltage source 11 to the switch circuit 21 is 1 kV (kilovolt), switch devices whose withstand voltages are 600 V or 650 V may be selected as the first switch device S1 to the sixth switch device S6, and switch devices whose withstand voltages are 1200 V may be selected as the seventh switch device S7 and the eighth switch device S8.

When each switch device in the converter is selected, because the switching frequency of each switch device in the first switch unit SU1 is the power frequency, a device whose saturation voltage drop (namely, switch-on voltage drop) is less than a preset voltage drop threshold may be selected, that is, a device whose switch-on voltage drop is relatively low may be selected. In addition, because the switching frequency of each switch device in the second switch unit SU2 is the high frequency, a device whose switching loss is less than a preset loss threshold may be selected, that is, a device whose switching loss is relatively low may be selected. The seventh switch device S7 in the third switch unit SU3 is switched on when the output end O of the switch circuit 21 is connected to the first end P of the direct current voltage source 11, and the eighth switch device S8 is switched on when the output end O of the switch circuit 21 is connected to the second end N of the direct current voltage source 11. Therefore, S7 and S8 generate no switching loss, and a device whose switch-on voltage drop is relatively low may also be selected.

Switch devices with different withstand voltages have different switch-on voltage drop ranges and switching loss ranges. Therefore, in actual application, an appropriate preset voltage drop threshold and preset loss threshold may be selected based on a withstand voltage of a switch device.

In addition, in the converter provided in this embodiment of the present disclosure, the switching frequency of each switch device in the first switch unit SU1 is the power frequency; the switching frequency of each switch device in the second switch unit SU2 is the high frequency, and a quantity of high-frequency switch devices is relatively small. Therefore, a switching loss of the switch circuit 21 is relatively low. In addition, because a voltage between the first connection point SP and the second connection point SN in the first switch unit SU1 may be stably maintained in $V_{in}/2$, there is no overvoltage risk caused by voltage imbalance between the switch devices in the first switch unit SU1.

An embodiment of the present disclosure provides a method for driving a converter, and the method may be used to drive the converter shown in FIG. 6. In each power frequency period, the driving method may be divided into two drive phases. Referring to FIG. 7, the driving method may include the following steps.

Step 101: In a first drive phase, switch on the first switch device S1 and the third switch device S3 in the first switch unit SW; switch off the second switch device S2 and the fourth switch device S4 in the first switch unit SU1; switch on and switch off each of the fifth switch device S5 and the sixth switch device S6 in the second switch unit SU2 at a high frequency and alternately switch on the fifth switch device S5 and the sixth switch device S6; switch on and switch off the seventh switch device S7 in the third switch unit SU3 at a preset frequency; and switch off the eighth switch device S8 in the third switch unit SU3, where in at least one switch-on period of the fifth switch device S5, the seventh switch device S7 and the fifth switch device S5 are switched on at the same time, or the seventh switch device S7 is switched on after a preset time period of delay, and the seventh switch device S7 is switched off before the fifth switch device S5 is switched off; when the fifth switch device S5 is switched on, the first end P of the direct current voltage source 11 is connected to the input end of the filter 12; and when the sixth switch device S6 is switched on, the third end M of the direct current voltage source 11 is connected to the input end of the filter 12.

The seventh switch device S7 is usually a device with a high withstand voltage, and a relatively long time is required for switching on and switching off the seventh switch device S7. Therefore, a switch-on delay between the seventh switch device S7 and the fifth switch device S5 may be greater than or equal to zero, for example, may be greater than or equal to a time required for switching on the fifth switch device S5; and a switch-off delay between the seventh switch device S7 and the fifth switch device S5 may be greater than or equal to a time required for switching off the seventh switch device S7. With reference to FIG. 6, it may be learned that in the first drive phase, the first switch device S1 and the third switch device S3 are switched on, and the fifth switch device S5 and the sixth switch device S6 are alternately switched on. Therefore, the output end O of the switch circuit 21 may alternately output a positive level and a zero level, and a frequency at which the positive level and the zero level are switched to each other is the high frequency.

Step 102: In a second drive phase, switch off the first switch device S1 and the third switch device S3 in the first switch unit SU1; switch on the second switch device S2 and the fourth switch device S4 in the first switch unit SU1; switch on and switch off the fifth switch device S5 and the sixth switch device S6 in the second switch unit SU2 at the high frequency, and alternately switch on the fifth switch device S5 and the sixth switch device S6; switch on and switch off the eighth switch device S8 in the third switch unit SU3 at the preset frequency; and switch off the seventh switch device S7 in the third switch unit SU3, where in at least one switch-on period of the sixth switch device S6, the eighth switch device S8 and the sixth switch device S6 are switched on at the same time, or the eighth switch device S8 is switched on after a preset time period of delay, and the eighth switch device S8 is switched off before the sixth switch device S6 is switched off; when the sixth switch device S6 is switched on, the second end N of the direct current voltage source 11 is connected to the input end of the filter 12; and when the fifth switch device S5 is switched on, the third end M of the direct current voltage source 11 is connected to the input end of the filter 12.

The eighth switch device S8 is usually a device with a high withstand voltage, and a relatively long time is required for switching on and switching off the eighth switch device S8. Therefore, a switch-on delay between the eighth switch device S8 and the sixth switch device S6 may be greater than or equal to zero, for example, may be greater than or equal to a time required for switching on the sixth switch device S6; and a switch-off delay between the eighth switch device S8 and the sixth switch device S6 may be greater than or equal to a time required for switching off the eighth switch device S8. With reference to FIG. 6, it may be learned that in the second drive phase, the second switch device S2 and the fourth switch device S4 are switched on, and the fifth switch device S5 and the sixth switch device are alternately switched on. Therefore, the output end O of the switch circuit 21 may alternately output a negative level and the zero level, and a frequency at which the negative level and the zero level are switched to each other is the high frequency. Further, a power-frequency alternating current voltage may be obtained after a high-frequency pulse voltage output by the output end O of the switch circuit 21 passes through the filter 12.

The preset frequency may be a power frequency, the high frequency, or a frequency between the power frequency and the high frequency.

In conclusion, in the method for driving a converter provided in this embodiment of the present disclosure, when the first switch device S1 and the fifth switch device S5 are switched on, that is, the output end O of the switch circuit 21 is connected to the first end P of the direct current voltage source 11, the seventh switch device S7 is controlled to be switched on. When the fourth switch device S4 and the sixth switch device S6 are switched on, that is, the output end O of the switch circuit 21 is connected to the second end N of the direct current voltage source 11, the eighth switch device S8 is controlled to be switched on. In this way; a switch-on voltage drop between the output end of the switch circuit 21 and each of the two ends of the direct current voltage source 11 may be a voltage drop of only one switch device, and the switch-on voltage drop is relatively small, thereby effectively reducing a conduction loss of the converter, in addition, the seventh switch device S7 and the fifth switch device S5 are switched on at the same time or the seventh switch device S7 is switched on after a delay, and the seventh switch device S7 is switched off before the fifth switch device S5 is switched off. Therefore, the seventh switch device S7 may be switched on or switched off at a low voltage or even a zero voltage, thereby effectively reducing a switching loss of the seventh switch device S7. Similarly, a switching loss of the eighth switch device S8 is also relatively low.

Figure 8:
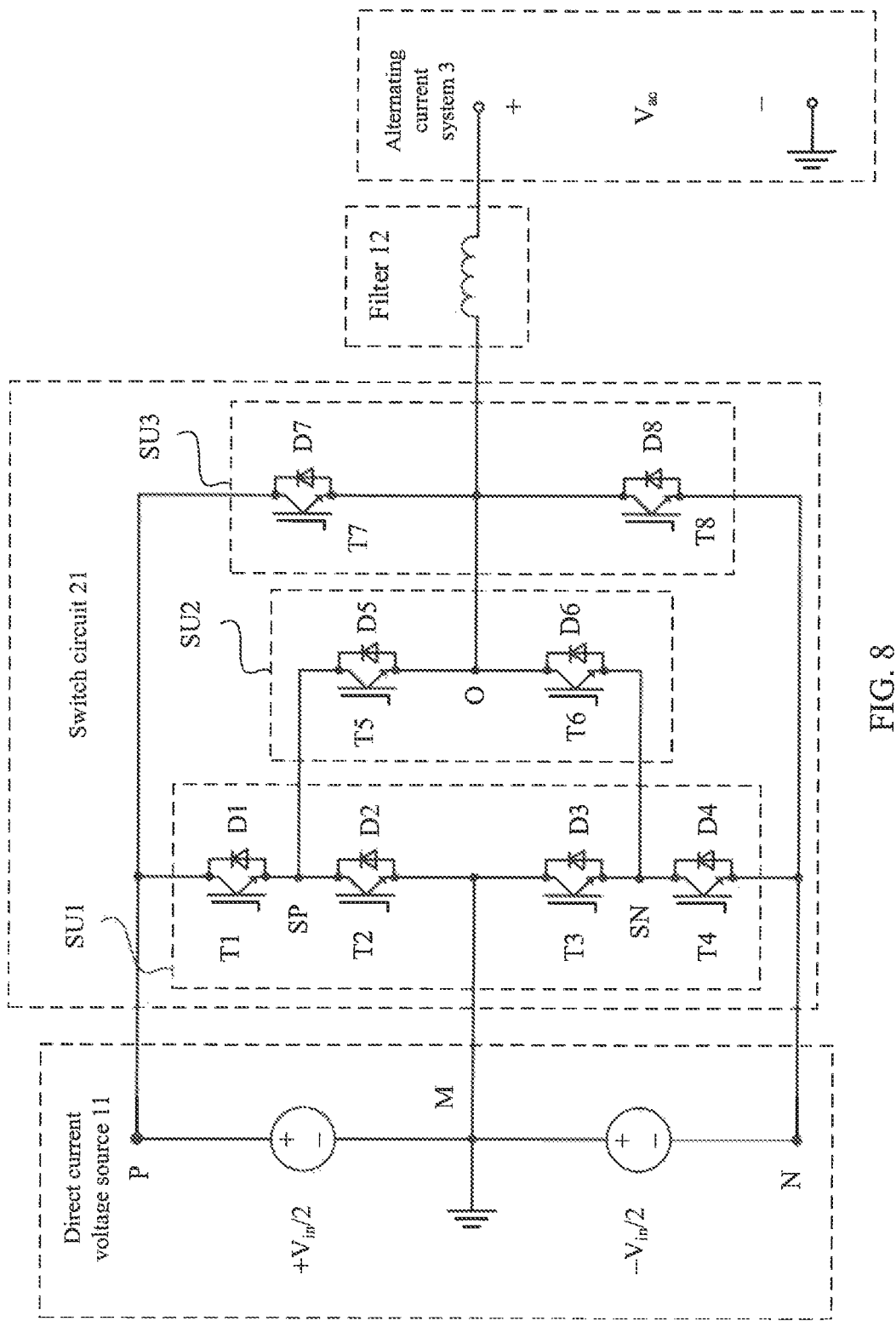
FIG. 8 is a schematic structural diagram of another converter according to an embodiment of the present disclosure.

In a first optional implementation of the embodiments of the present disclosure, each of the first switch device S1 to the eighth switch device S8 may include an IGBT and a diode anti-parallel to the IGBT. Referring to FIG. 8, the first switch unit SU1 may include four IGBTs (namely, T1 to T4) that are connected in series. The IGBT T1 is anti-parallel to a diode D1, the IGBT T2 is anti-parallel to a diode D2, the IGBT T3 is anti-parallel to a diode D3, and the IGBT T4 is anti-parallel to a diode D4. A first end of T1, a second end of T4, and a connection point between T2 and T3 constitute three input ends of the first switch unit SU1, and the three input ends are respectively connected to the first end P, the second end N, and the third end M of the direct current voltage source 011. A first connection point SP between T1 and T2 and a second connection point SN between T3 and T4 are two output ends of the first switch unit SU1.

The second switch unit SU2 includes two IGBTs (namely, T5 and T6) that are connected in series. The IGBT T5 is anti-parallel to a diode D5, and the IGBT T5 is anti-parallel to a diode D6. A first end of T5 is the first end of the second switch unit SU2, and the first end of the second switch unit SU2 is connected to one output end of the first switch unit SU1, for example, is connected to the first connection point SP. A second end of T6 is the second end of the second switch unit SU2, and the second end is connected to the other output end of the first switch unit SU1, for example, is connected to the second connection point SN. A connection point between T5 and T6 is the third end of the second switch unit SU2, and the third end is connected to the input end O of the filter 12.

The third switch unit SU3 includes two IGBTs (namely, T7 and T8) that are connected in series. The IGBT T7 is anti-parallel to a diode D7, and the IGBT T8 is anti-parallel to a diode 138. The first end and the second end of the third switch unit SU3 are respectively connected to the first end P and the second end N of the direct current voltage source 011, and the third end of the third switch unit SU3 is connected to the input end O of the filter 12. A first end of T7 is the first end of the third switch unit SU3, a second end of T8 is the second end of the third switch unit SU3, and a connection point between T7 and T8 is the third end of the third switch unit SU3.

Figure 9:
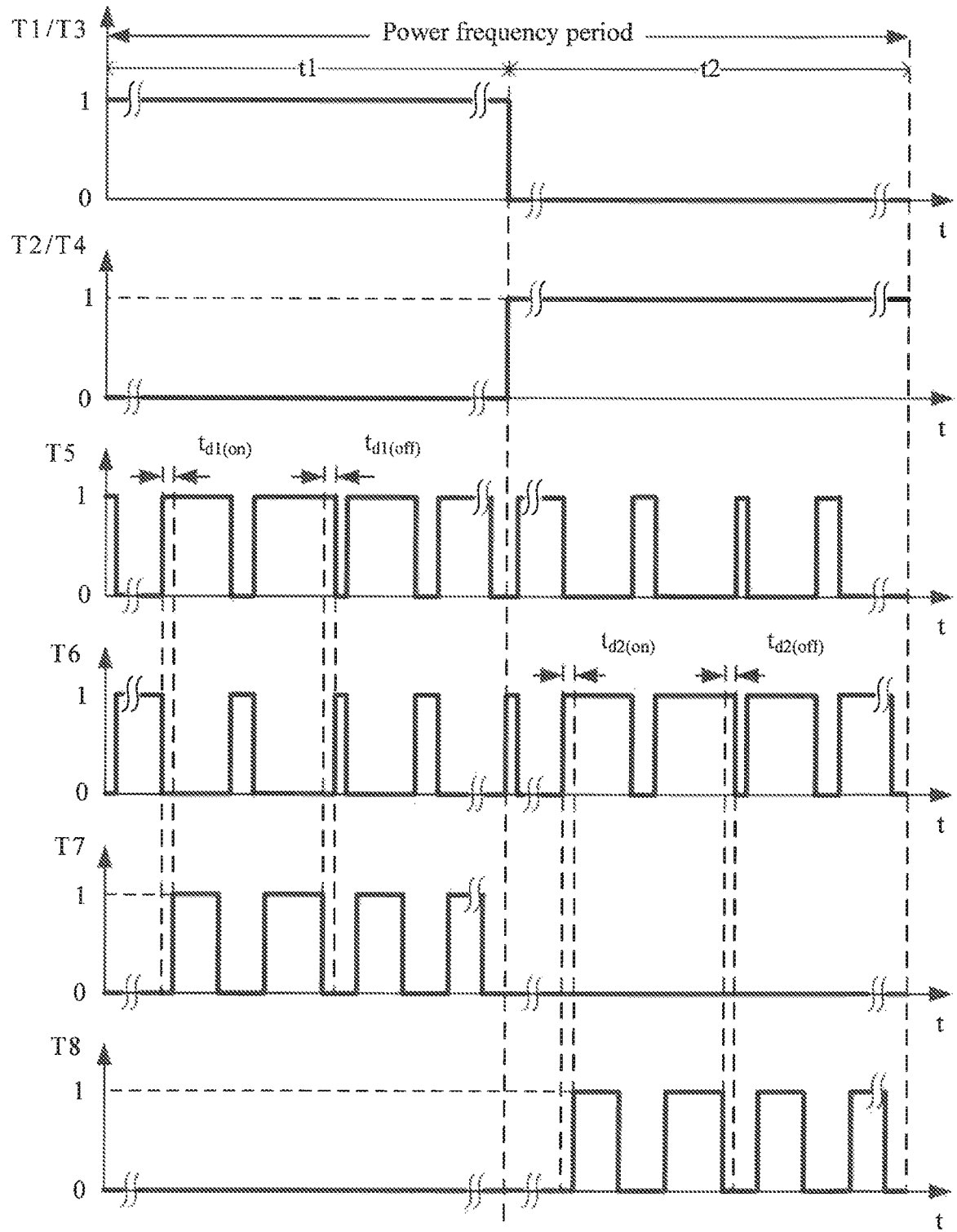
FIG. 9 is a diagram of a time sequence of a drive signal used to drive each switch device according to an embodiment of the present disclosure.

The converter shown in FIG. 8 is used as an example to describe in detail a converter driving principle provided in the embodiments of the present disclosure. FIG. 9 is a diagram of a time sequence of a drive signal used to drive each switch device according to an embodiment of the present disclosure. The drive signal of each switch device may be output by the control module, and the control module may be connected to a gate electrode of the IGBT in each switch device, so as to control switch-on or switch-off of each IGBT. When a level of each drive signal is 1, it indicates that the switch device is switched on; and when the level of each drive signal is 0, it indicates that the switch device is switched off. It may be learned from FIG. 9 that a switching frequency of each of the IGBT T1 to the IGBT T4 is the power frequency. In addition, switch-on and switch-off states of T1 are synchronous with those of T3, switch-on and switch-off states of T2 are synchronous with those of T4, and switch-on and switch-off states of T1 are complementary to those of T2. To be specific, a time sequence of the first drive signal used to drive T1 is exactly the same as a time sequence of the third drive signal used to drive T3, a time sequence of the second drive signal used to drive T2 is exactly the same as a time sequence of the fourth drive signal used to drive T4, and the first drive signal and the second drive signal are complementary signals. A switching frequency of each of the IGBTs T5 and T6 is the high frequency, and switch-on and switch-off states of T5 are complementary to those of T6. In each power frequency period, the IGBTs T7 and T8 are in a switch-off state in half of the period, and are switched off at the preset frequency in the other half of the period. In addition, T7 is switched off in a switch-off phase of T1, and T8 is switched off in a switch-off phase of T2, The preset frequency may be the power frequency, the high frequency, or a frequency between the power frequency and the high frequency.

In a first drive phase t1 of each power frequency period, the IGBTs in the first switch device S1 and the third switch device S3 are switched on, that is, T1 and T3 are switched on; T2 and T4 are switched off; and T5 and T6 are switched on and switched off at the high frequency, and switch-on and switch-off states of T5 are complementary to those of T6. In each switch-on period of T5, the first end P of the direct current voltage source 011 is connected to the input end O of the filter 12, and the switch circuit 21 outputs a positive level of +Vin/2. In addition, in at least one switch-on period of T5, T7 may be switched on after a preset time period of delay $t_{d1(on)}$ ($t_{d1(on)} \geq 0$) compared with T5, and may be switched off before a period of time $t_{d1(off)}$ ($t_{d1(off)} > 0$) compared with T5. For example, as Shown in FIG. 9, in the first drive phase t1, T1 may be switched on in each switch-on period of T5. In a switch-on phase of T7, because a switch-on voltage drop of T7 is far less than a sum of switch-on voltage drops of T1 and T5, most currents flow through the switch device T7 whose switch-on voltage drop is relatively low, thereby effectively reducing a conduction loss of the switch circuit 21.

Further, when the IGBT T6 in the sixth switch device S6 is switched on, with reference to FIG. 8, if a current direction is flowing from a direct current side to an alternating current side (that is, the converter is configured to convert a direct current voltage into an alternating current voltage), the third end M of the direct current voltage source 11 may be connected to the input end O of the filter 12 using T3 and the diode D6 in the sixth switch device S6. If the current direction is flowing from the alternating current side to the direct current side (that is, the converter is configured to convert an alternating current voltage into a direct current voltage), the third end M of the direct current voltage source 11 may be connected to the input end O of the filter 12 using T6 and D3. In this case, the switch circuit 21 outputs a zero level. In conclusion, in the first drive phase t1 of each power frequency period, the switch circuit 21 may alternately output high-frequency pulse voltages in two states: +$V_{in}$/2 and 0.

In addition, it may be further learned from FIG. 9 that when $t_{d1(on)} = t_{d1(off)}$ (off), and T7 is switched on in each switch-on period of T5, a switching frequency of T7 may be equal to a switching frequency of T5, that is, the preset frequency may be the high frequency. However, a duty cycle of the seventh drive signal used to drive T7 is less than a duty cycle of the fifth drive signal used to drive T5, that is, in each high frequency period, a switch-on time of T7 is less than a switch-on time of T5.

Figure 10:
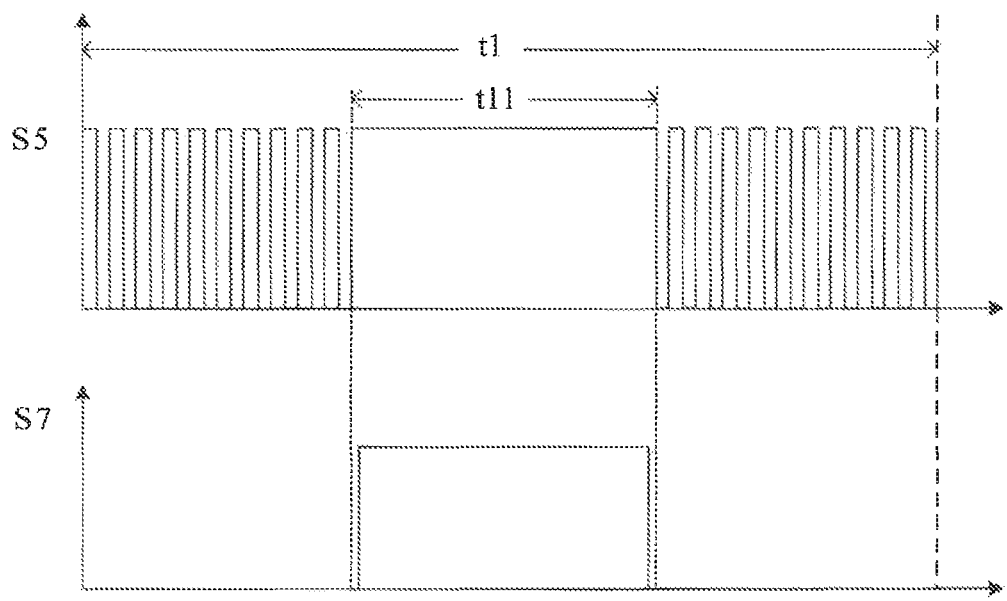
FIG. 10 is a diagram of time sequences of drive signals used to drive a fifth switch device and a seventh switch device according to an embodiment of the present disclosure.

FIG. 10 is a diagram of time sequences of drive signals used to drive a fifth switch device and a seventh switch device according to an embodiment of the present disclosure. In actual application, the fifth switch device S5 may be constantly switched on in a period of time in half of a power frequency period, and is switched on and switched off at the high frequency in a remaining period of time. However, the seventh switch device S7 can be switched on in only a period of time in which the fifth switch device is constantly switched on. In this case, the switching frequency of the seventh switch device S7 is relatively low. For example, in FIG. 10, a first drive phase t1 is used as an example. The fifth switch device S5 is constantly switched on in a time period t11, and is switched on and switched off at the high frequency in a remaining time period. Correspondingly, the seventh switch device S7 can be switched on in only the time period t11, and is switched off in a remaining time. In addition, it may be further learned from FIG. 10 that the seventh switch device S7 may be switched on after the fifth switch device S5 is constantly switched on, and is switched off before the fifth switch device S5 is switched off.

Figure 11:
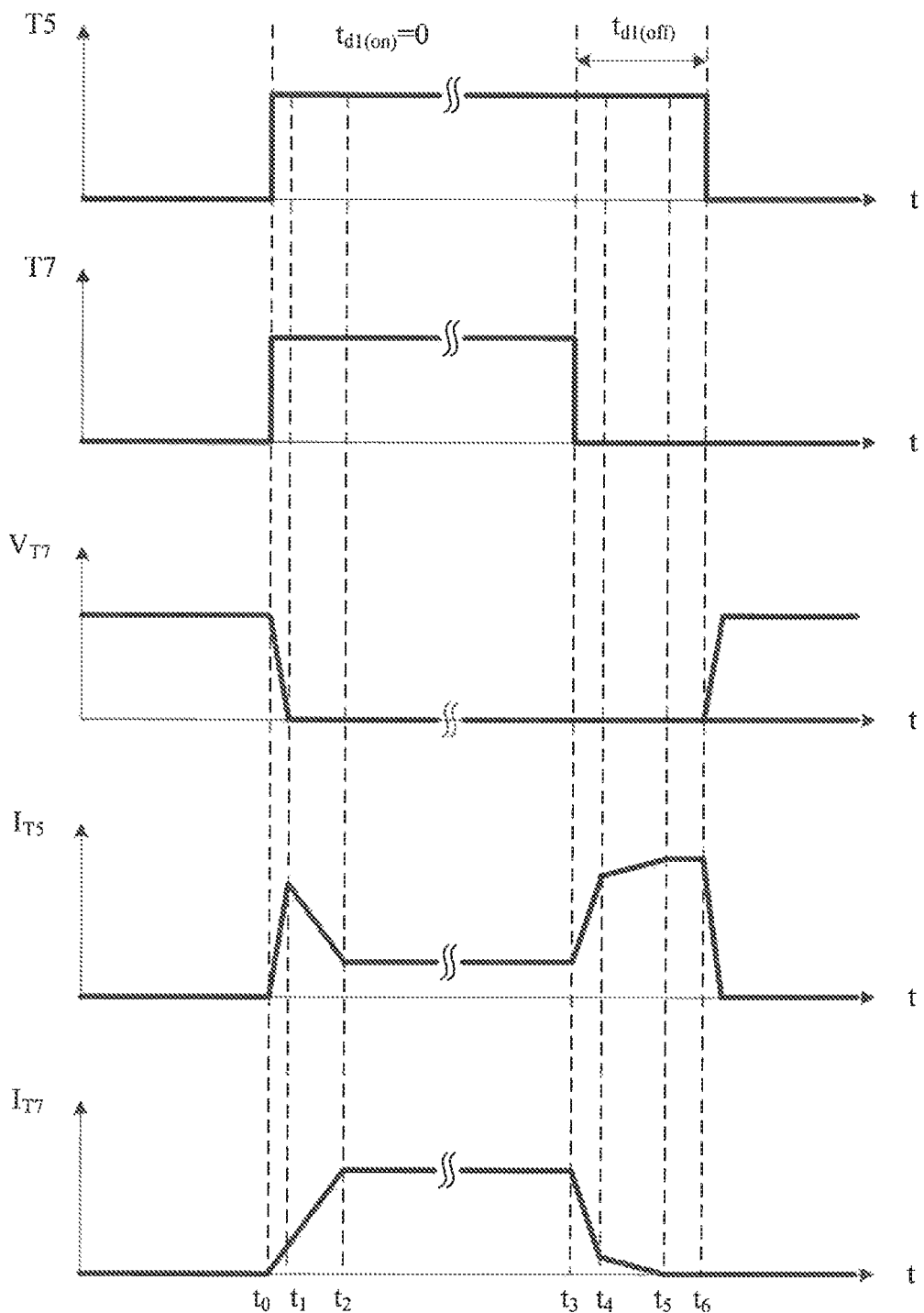
FIG. 11 is a schematic change diagram of a time sequence for driving T5 and T7, a voltage, and a current according to an embodiment of the present disclosure.
Figure 12:
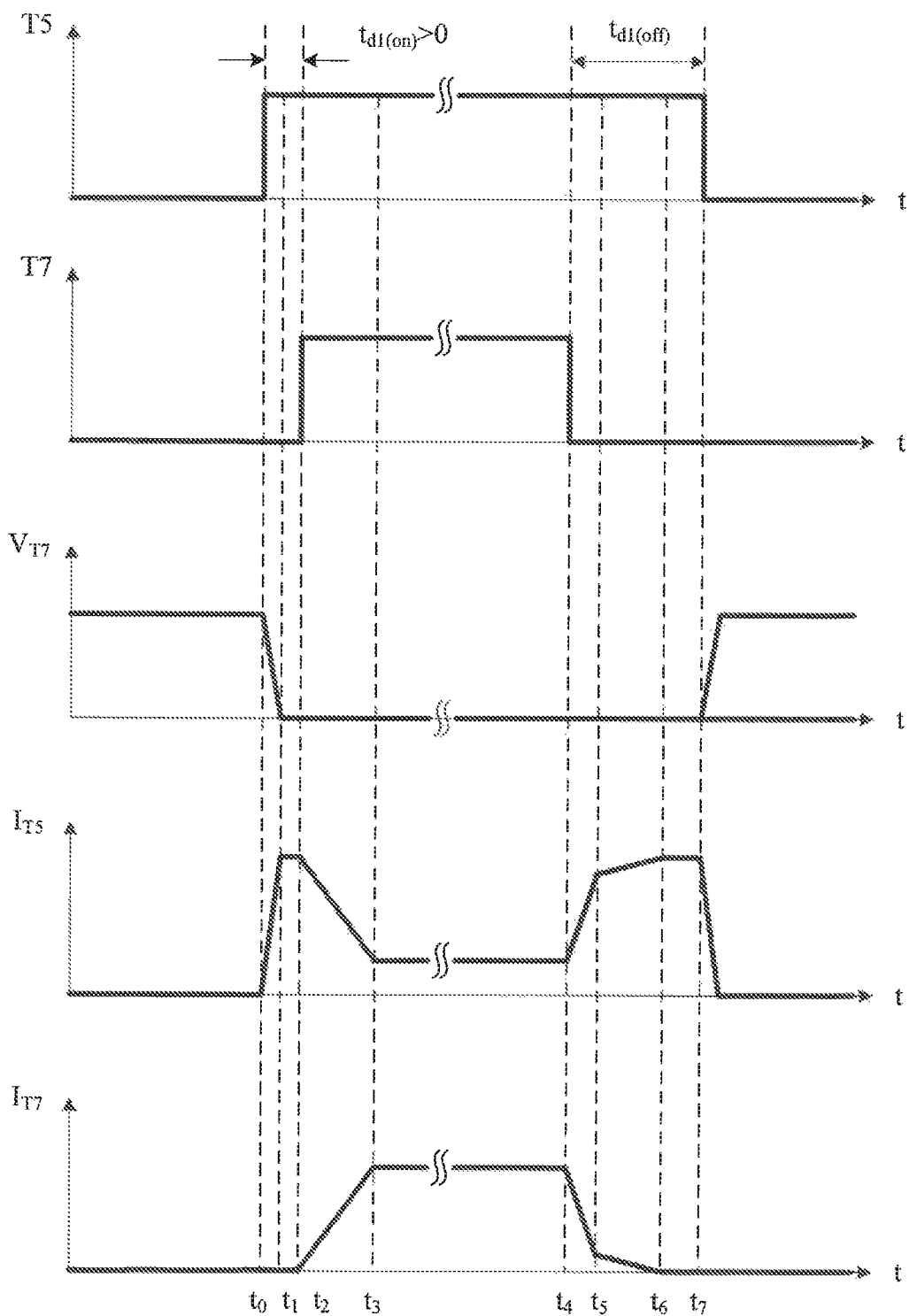
FIG. 12 is another schematic change diagram of a time sequence for driving T5 and T7, a voltage, and a current according to an embodiment of the present disclosure.

FIG. 11 is a schematic change diagram of a time sequence for driving T5 and T7, a voltage, and a current according to an embodiment of the present disclosure. FIG. 12 is another schematic change diagram of a time sequence for driving T5 and T7, a voltage, and a current according to an embodiment of the present disclosure. $V_{T7}$ represents voltages at two ends of T7, $I_{T7}$ represents a current flowing through T7, and $V_{T5}$ represents a current flowing through T5. Referring to FIG. 11, it may be learned that in a switch-on period of T5, when T7 and T5 are switched on at the same time (that is, $t_{d1(on)} = 0$), it is assumed that the seventh drive signal used to drive T7 and the fifth drive signal used to drive T5 simultaneously jump from 0 to 1 at a moment $t_0$, Because T7 is a device with a high withstand voltage, and a switch-on speed of T7 is slower than a switch-on speed of T5, the voltages $V_{T7}$ at the two ends of T7 rapidly decrease in the switch-on phase of T5. When T5 is completely switched on at a moment $t_1$, the voltages $V_{T7}$ at the two ends of T7 decrease to the sum of the switch-on voltage drops of T1 and T5, and the voltages are close to 0. Therefore, T7 can be switched on at a low voltage or even a zero voltage, thereby effectively reducing a switching loss of T7. After T7 is completely switched on at a moment t2, because the switch-on voltage drop of T7 is far less than the sum of the switch-on voltage drops of T1 and T5, most currents flow through the switch device T7 whose switch-on voltage drop is relatively low. It may be learned from FIG. 11 that in the phase from $t_2$ to $t_3$, the current $I_{T5}$ flowing through T5 is smaller, and the current $I_{T7}$ flowing through T7 is larger, thereby effectively reducing a conduction loss of the switch circuit 21.

Further, a switch-off speed of T7 is also relatively slow. Therefore, to switch off T7 at a low voltage or even a zero voltage to reduce the switching loss of T7, T7 needs to be controlled to be switched off before T5 (that is, $t_{d1(off)} > 0$). Referring to FIG. 11, it is assumed that the seventh drive signal used to drive T7 jumps from 1 to 0 at a moment $t_3$, and T7 starts to be switched off. In a phase from $t_3$ to $t_4$, the current $I_{T7}$ of T7 decreases rapidly. In a phase from $t_4$ to $t_5$, the current $I_{T7}$ of T7 slowly decreases to 0, and T7 is completely switched off. In this case. T5 may start to be switched off. In actual application, to reserve a redundancy time, a switch-off delay $t_{d1(off)}$ between T7 and T5 may be slightly greater than a time required for switching off T7. For example, in FIG. 11, the time required for switching off T7 is $t_5$–$t_3$, and the switch-off delay is $t_{d1(off)}=t_6$–$t_3$, where $t_6$ is greater than $t_5$, so as to effectively ensure that T7 is switched off at a zero voltage.

Referring to FIG. 12, it may be learned that in a switch-on period of T5, when T7 is switched on after T5 (that is, $t_{d1(on)}>0$), it is assumed that a switch-on delay between T7 and T5 is $t_{d1(on)}=t_2-t_0$, and a time required for completely switching on T5 is $t_1-t_0$. Therefore, when the seventh drive signal used to drive T7 jumps from 0 to 1 at the moment $t_2$ to drive T7 to be switched on, the voltages $V_{T7}$ at the two ends of T7 are the sum of the switch-on voltage drops of T1 and T5, and the voltages $V_{T7}$ are close to 0, such that T7 can be switched on under a condition that the voltages are close to zero. After T7 is completely switched on at the moment $t_3$, most currents flow through the switch device T7 whose switch-on voltage drop is relatively low. Afterwards, T7 starts to be switched off at a moment $t_4$. In the phase from $t_4$ to $t_5$, the current $I_{T7}$ of T7 decreases rapidly. In a phase from $t_5$ to $t_6$, the current $I_{T7}$ of T7 slowly decreases to 0, and T7 is completely switched off. Then T5 may start to be switched off at a moment $t_7$.

Further, referring to FIG. 9, in a second drive phase t2, the IGBTs T2 and T4 in the second switch device S2 and the fourth switch device S4 are switched on, and T1 and T3 are switched off. In each switch-on period of T6, the second end N of the direct current voltage source 11 is connected to the input end O of the filter 12, and the switch circuit 21 outputs a negative level $-V_{in}/2$. In addition, in at least one switch-on period of T6, T8 may be switched on after a preset time period of delay $t_{d2(off)}$ ($t_{d1(off)}>0$) compared with T6, and may be switched off before a period of time $t_{d2(off)}$ ($t_{d1(off)}>0$) compared with T6, so as to effectively reduce a switching loss of T8. For example, as shown in FIG. 12, in the second drive phase t2, T8 may be switched on in each switch-on period of T6. Alternatively, for switching frequencies of T6 and T8, refer to FIG. 11. To be specific, in the second drive phase t2, T6 may be constantly switched on in a period of time, and is switched off in a remaining time at the high frequency; and T8 can be switched on in only a period of time in which T6 is constantly switched on. In a switch-on phase of T8, because a switch-on voltage drop of T8 is far less than a sum of switch-on voltage drops of T4 and T6, most currents flow through the switch device T8 whose switch-on voltage drop is relatively low, thereby effectively reducing a conduction loss of the switch circuit 21.

When the IGBT T5 in the fifth switch device S5 is switched on, with reference to FIG. 8, if a current direction is flowing from a direct current side to an alternating current side (that is, the converter is configured to convert a direct current voltage into an alternating current voltage), the third end M of the direct current voltage source 11 may be connected to the input end O of the filter 12 using D2 and T5. In addition, if the current direction is flowing from the alternating current side to the direct current side (that is, the converter is configured to convert an alternating current voltage into a direct current voltage), the third end M of the direct current voltage source 11 may be connected to the input end O of the filter 12 using D5 and T2. In this case, the switch circuit 21 outputs a zero level. In conclusion, in the second drive phase t2 of each power frequency period, the switch circuit 21 may alternately output high-frequency pulse voltages in two states: $-V_{in}/2$ and 0.

In conclusion, in the converter provided in the embodiments of the present disclosure, a switching frequency of each of the IGBTs T1 to T4 is the power frequency, and switching losses of the IGBTs are extremely low. T7 and T8 can be switched on and switched off at a low voltage or even a zero voltage, and the switching losses of T7 and T8 are almost zero. Only T5 and T6 with a low withstand voltage and a low switching loss are switched on at the high frequency. Therefore, the switching loss of the entire switch circuit 21 is relatively low.

Figure 13:
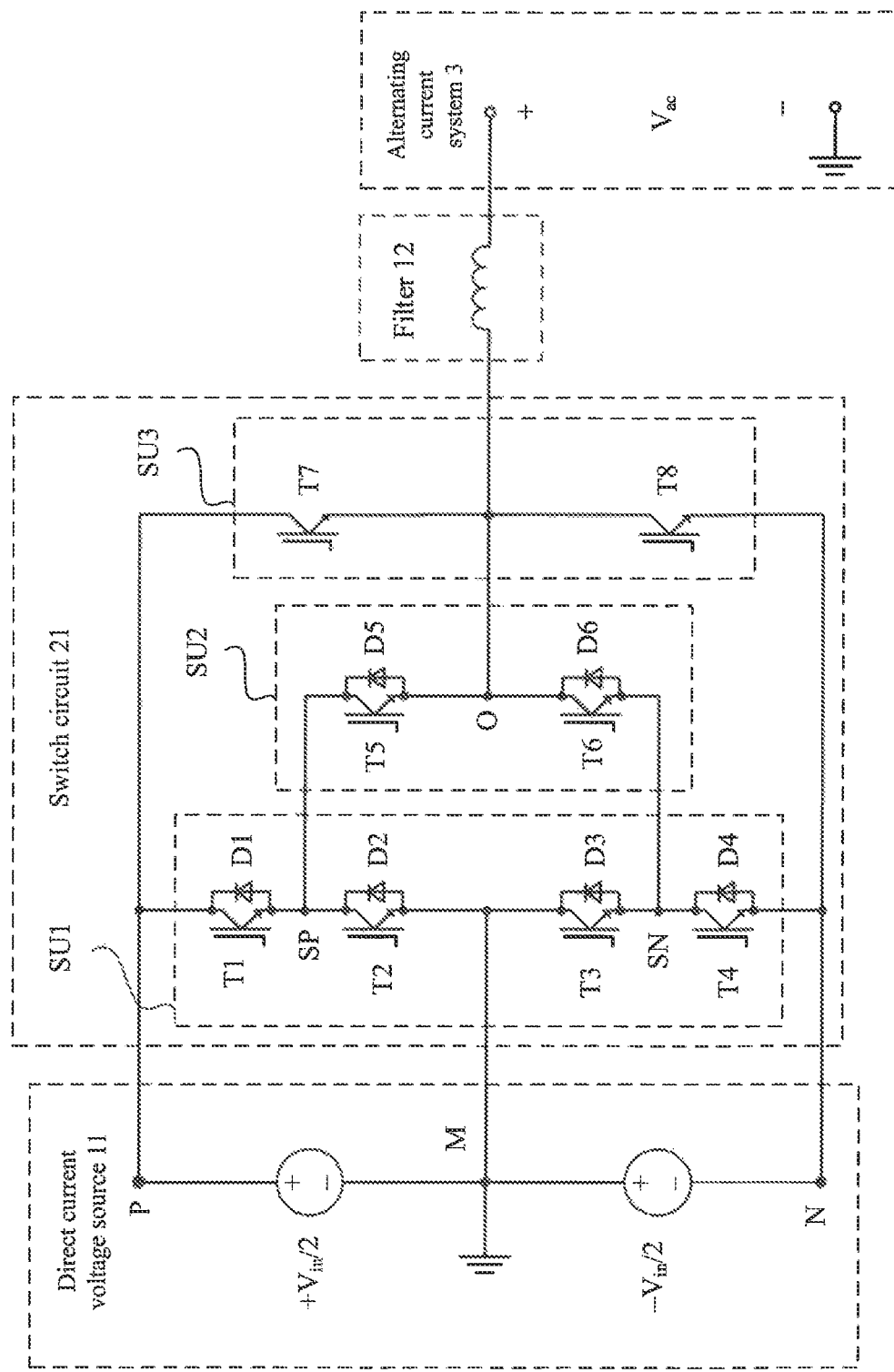
FIG. 13 is a schematic structural diagram of another converter according an embodiment of the present disclosure.

In a second optional implementation of the embodiments of the present disclosure, referring to FIG. 13, each of the first switch device S1 to the sixth switch device S6 includes an IGBT and a diode anti-parallel to the IGBT, and the seventh switch device S7 and the eighth switch device S8 each includes an IGBT. It may be learned from FIG. 13 that the first switch device S1 includes an IGBT T1 and a diode D1 anti-parallel to the IGBT T1, the second switch device S2 includes an IGBT T2 and a diode D2 anti-parallel to the IGBT T2, the third switch device S3 includes an IGBT T3 and a diode D3 anti-parallel to the IGBT T3, the fourth switch device S4 includes an IGBT T4 and a diode D4 anti-parallel to the IGBT T4, the fifth switch device S5 includes an IGBT T5 and a diode D5 anti-parallel to the IGBT 5, the sixth switch device S6 includes an IGBT T6 and a diode D6 anti-parallel to the IGBT T6, the seventh switch device S3 includes an IGBT T7, and the eighth switch device S8 includes an IGBT T8. Driving logic of the IGBTs T1 to T8 may be the same as driving logic of T1 to T8 in the converter shown in FIG. 8. For a specific time sequence for driving the IGBTs to T8, refer to FIG. 9. For a specific driving principle of the IGBTs T1 to T8, refer to the foregoing related descriptions. Details are not described herein again.

Compared with the structure shown in FIG. 8, diodes anti-parallel to T7 and T8 are omitted in the structure shown in FIG. 13. When a positive level is output and a current flows from an alternating current side to a direct current side, the diodes D1 and D5 are switched on. When a negative level is output and the current flows from the direct current side to the alternating current side, the diodes D4 and D6 are switched on. In this way, the switch circuit 21 works normally, and costs of the switch devices are reduced.

Figure 14:
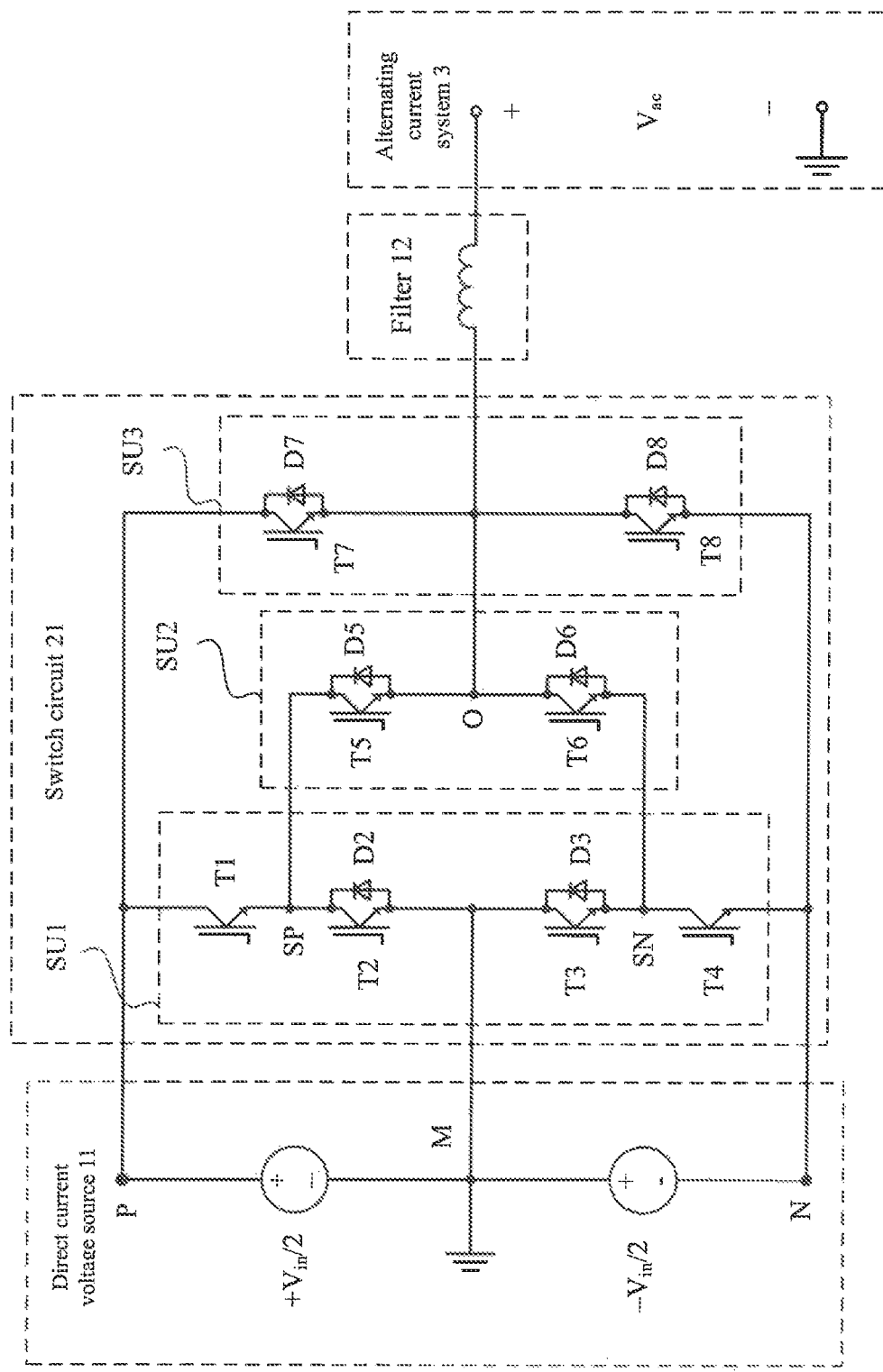
FIG. 14 is a schematic structural diagram of still another converter according to an embodiment of the present disclosure.

In a third optional implementation of the embodiments of the present disclosure, referring to FIG. 14, the first switch device S1 includes an IGBT T1, and the fourth switch device S4 includes an IGBT T4. Each of switch devices other than the first switch device S1 and the fourth switch device S4 in the converter has a structure the same as the structure shown in FIG. 8, that is, each switch device includes an IGBT and a diode anti-parallel to the IGBT.

Driving logic of the IGBTs T1 to T8 may be the same as driving logic of T1 to T8 in the converter shown in FIG. 8. For a specific time sequence for driving the IGBTs to T8, refer to FIG. 9. For a specific driving principle of the IGBTs T1 to T8, refer to the foregoing related descriptions. Details are not described herein again.

Compared with the structure shown in FIG. 8, diodes anti-parallel to T1 and T4 are omitted in the structure shown in FIG. 14. When a positive level is output and a current flows from an alternating current side to a direct current side, the diode D7 is switched on. When a negative level is output and the current flows from the direct current side to the alternating current side, the diode D8 is switched on. In this way, the circuit works normally, and costs of the switch devices in the switch circuit 21 are reduced.

Figure 15:
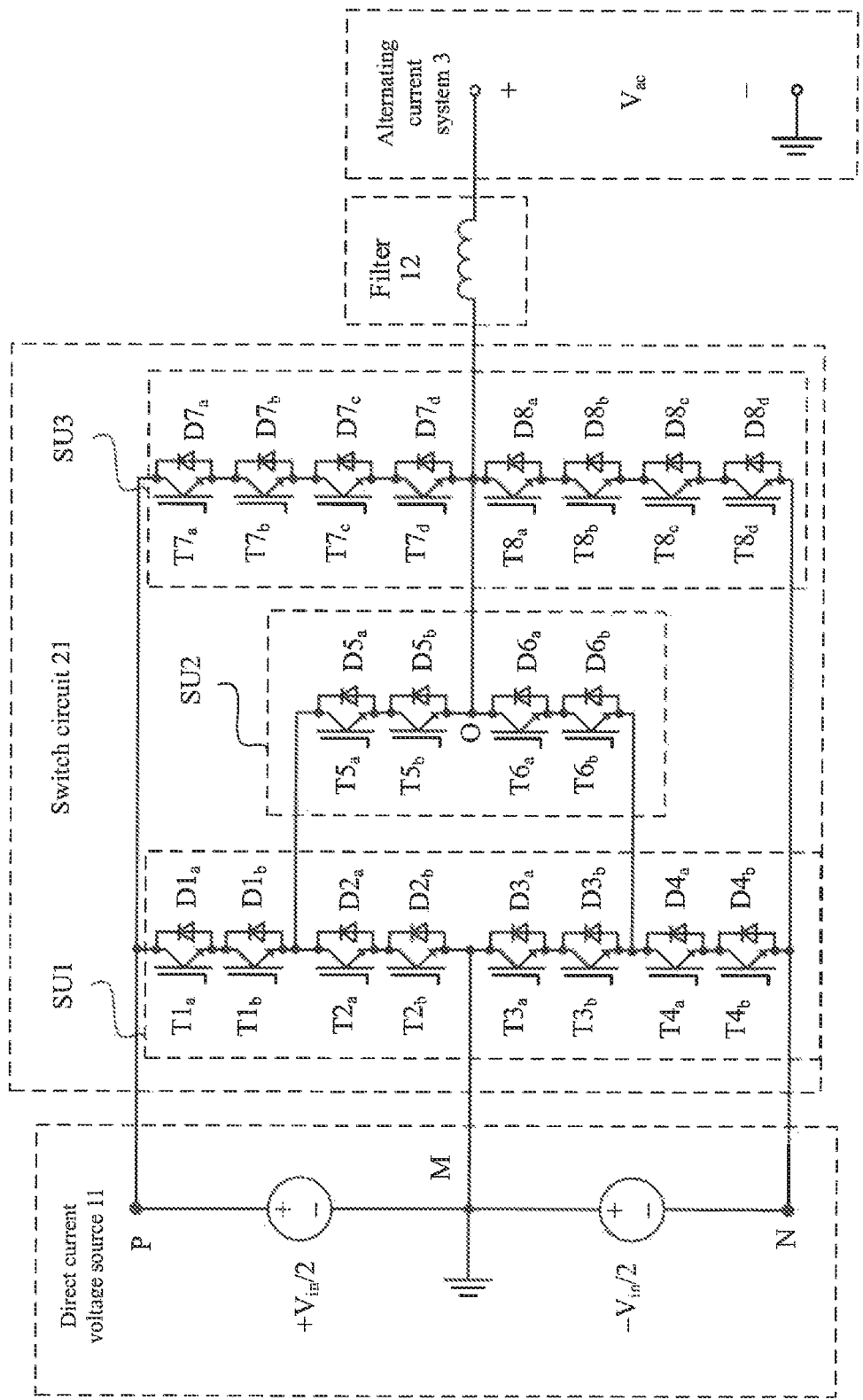
FIG. 15 is a schematic structural diagram of still another converter according to an embodiment of the present disclosure.

In a fourth optional implementation of the embodiments of the present disclosure, referring to FIG. 15, each of the first switch device S1 to the eighth switch device S8 includes a plurality of IGBTs that are connected in series, and each IGBT is anti-parallel to a diode. For example, in FIG. 15, each of the first switch device S1 to the sixth switch device S6 includes two IGBTs that are connected in series and a diode anti-parallel to each IGBT. Each of the seventh switch device S7 and the eighth switch device S8 includes four IGBTs that are connected in series and a diode anti-parallel to each IGBT. For example, the first switch device S1 includes $T1_a$ and $T1_b$ that are connected in series, $T1_a$ is anti-parallel to a $D1_a$, and $T1_b$ is anti-parallel to a $D1_b$. The seventh switch device S7 includes $T7_a$ to $T7_d$ that are connected in series, and $T7_a$ to $T7_d$ are respectively anti-parallel to $D7_a$ to $D7_d$.

The plurality of IGBTs in each switch device have same driving logic. For example, time sequences of drive signals of $T1_a$ and $T1_b$ in the first switch device S1 are the same, time sequences of drive signals of $T2_a$ and $T2_b$ in the second switch device S2 are the same, and time sequences of drive signals of $T7_a$ and $T7_b$ in the seventh switch device are the same. A case for another switch device is similar. In addition, driving logic of the first switch device S1 to the eighth switch device S8 may be the same as driving logic of T1 to T8 in the converter shown in FIG. 8. For a specific time sequence for driving the first switch device S1 to the eighth switch device S8, refer to FIG. 9. For a specific driving principle of the first switch device S1 to the eighth switch device S8, refer to the foregoing related descriptions. Details are not described herein again.

Compared with the structure shown in FIG. 8, a plurality of IGBTs or diodes that are connected in series are used in the structure shown in FIG. 15, such that switch devices with a relatively low withstand voltage may be used in a high-voltage application scenario, and devices with a same withstand voltage may be used as the switch devices.

Figure 16:
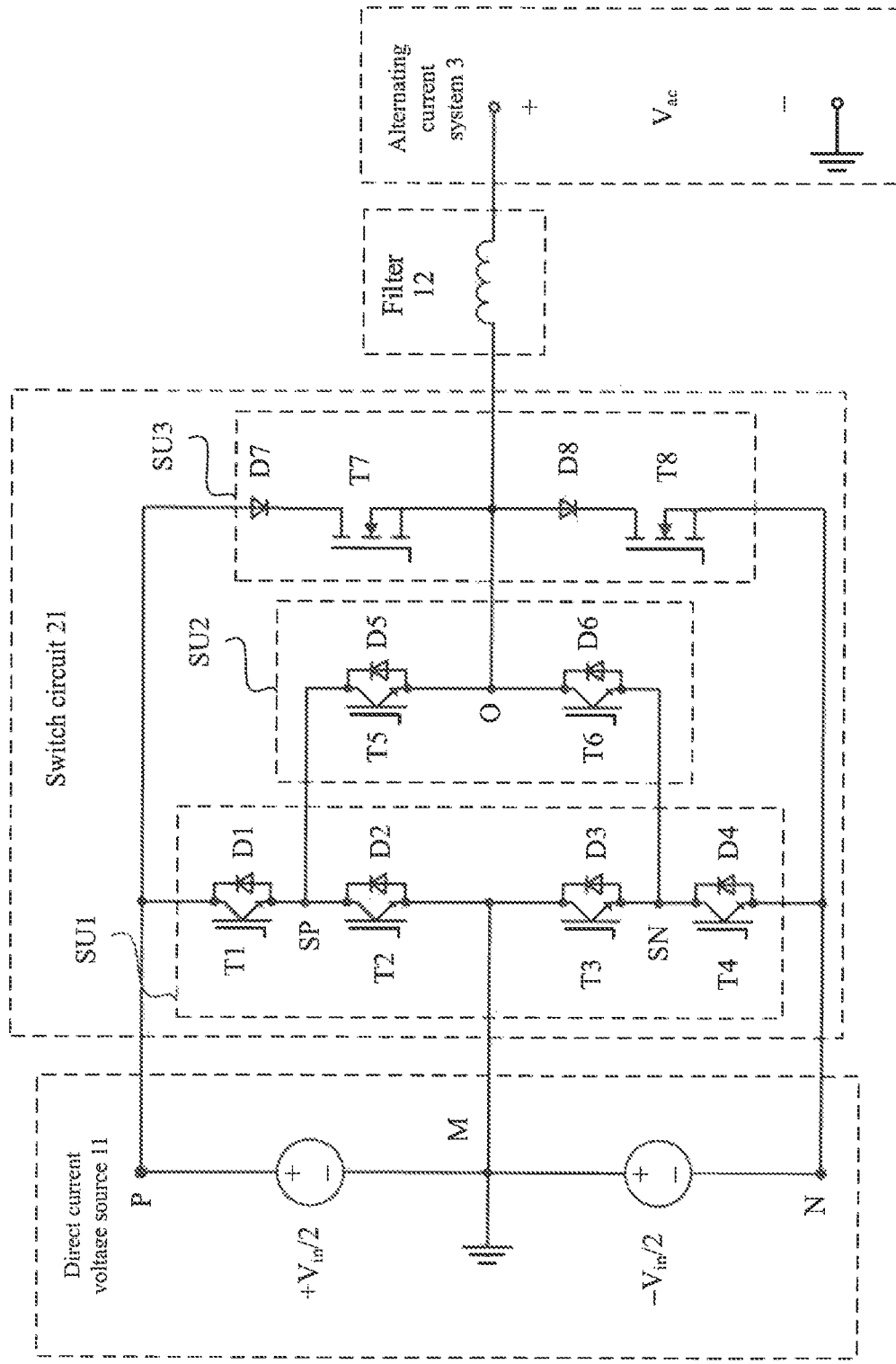
FIG. 16 is a schematic structural diagram of still another converter according to an embodiment of the present disclosure.

In a fifth optional implementation of the embodiments of the present disclosure, referring to FIG. 16, each of the first switch device S1 to the sixth switch device S6 includes an IGBT and a diode anti-parallel to the IGBT. Each of the seventh switch device S7 and the eighth switch device S8 includes an MOSFET and a diode that are connected in series; or each of the seventh switch device S7 and the eighth switch device S8 may include a wide bandgap device and a diode that are connected in series, for example, the seventh switch device S7 includes T7 and D7 that are connected in series; or each of the seventh switch device S7 and the eighth switch device S8 may include only one wide bandgap device (FIG. 16 shows only a structure in which diodes are connected in series). The wide bandgap device may be a GaN device or a SiC device.

Driving logic of the first switch device S1 to the eighth switch device S8 may be the same as driving logic of T1 to T8 in the converter shown in FIG. 8. For a specific time sequence for driving the first switch device S1 to the eighth switch device S8, refer to FIG. 9. For a specific driving principle of the first switch device S1 to the eighth switch device S8, refer to the foregoing related descriptions. Details are not described herein again.

Compared with the structure shown in FIG. 8, the switch devices S7 and S8 in the structure shown in FIG. 16 each include the MOSFET or the wide bandgap device. In a low-power application scenario, switch-on voltage drops of the MOSFET and the wide bandgap device each are lower than a switch-on voltage drop of the IGBT. Therefore, selecting an appropriate MOSFET or wide bandgap device may further reduce a conduction loss. In addition, because a switch device loss is relatively large when a parasitic body diode of the MOSFET is switched off, connecting the MOSFET and the parasitic body diode in series can prevent a positive level from being output and prevent a current from flowing through the parasitic body diode of the MOSFET when the current flows from a direct current side to an alternating current side.

Figure 17:
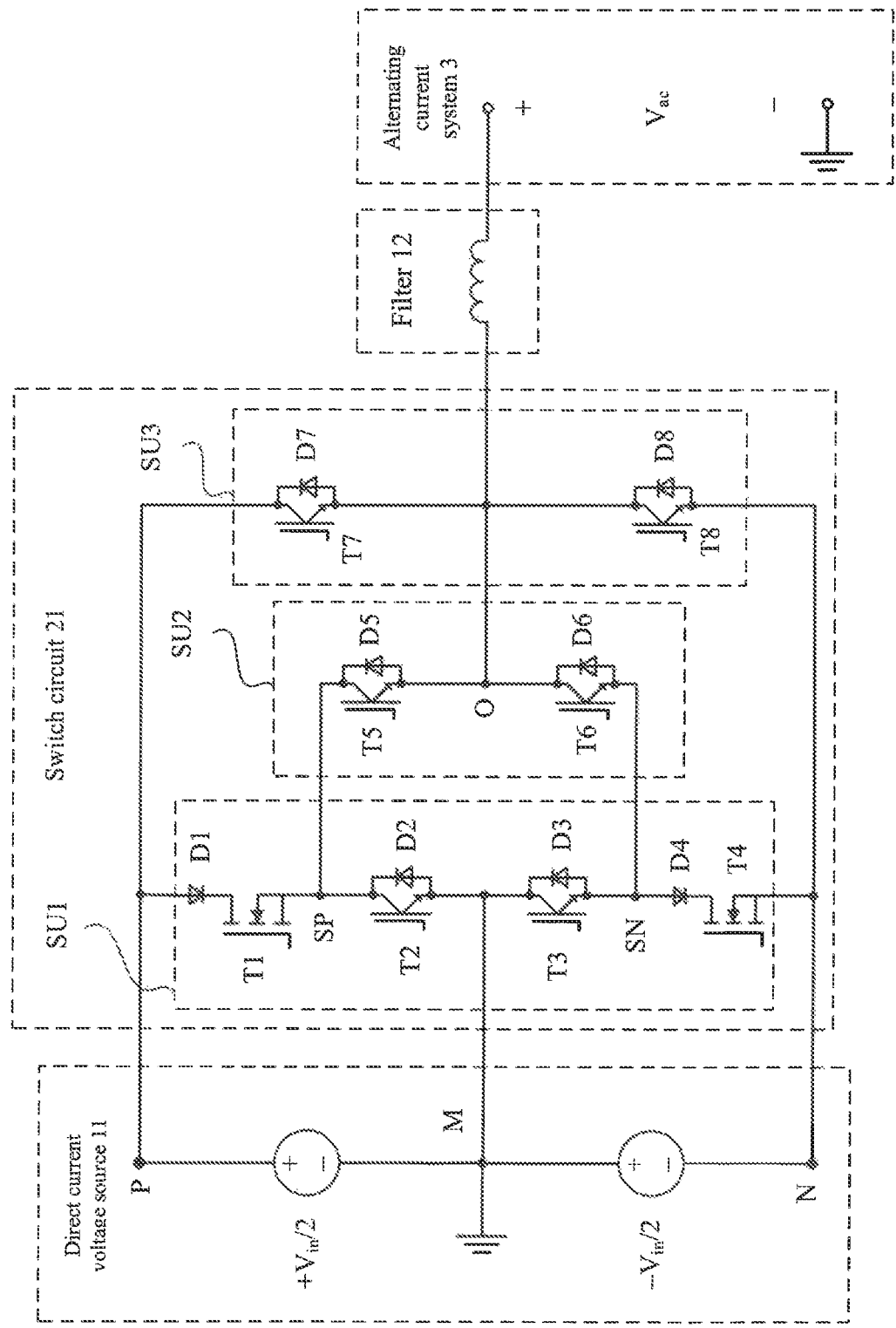
FIG. 17 is a schematic structural diagram of still another converter according to an embodiment of the present disclosure.

In a sixth optional implementation of the embodiments of the present disclosure, referring to FIG. 17, each of the first switch device S1 and the fourth switch device S4 may include an MOSFET and a diode that are connected in series, for example, the first switch device S1 includes T1 and D1 that are connected in series; or each of the first switch device S1 and the fourth switch device S4 may include a wide bandgap device and a diode that are connected in series; or each of the first switch device S1 and the fourth switch device S4 may include only one wide bandgap device (FIG. 17 shows only a structure in which diodes are connected in series). The wide bandgap device may be a GaN device or a SiC device. Each of switch devices other than the first switch device S1 and the fourth switch device S4 in the converter may have a structure the same as the structure shown in FIG. 8, that is, each switch device includes an IGBT and a diode anti-parallel to the IGBT.

Driving logic of the first switch device S1 to the eighth switch device S8 may be the same as driving logic of T1 to T8 in the converter shown in FIG. 8. For a specific time sequence for driving the first switch device S1 to the eighth switch device S8, refer to FIG. 9. For a specific driving principle of the first switch device S1 to the eighth switch device S8, refer to the foregoing related descriptions. Details are not described herein again.

Compared with the structure shown in FIG. 8, the switch devices S1 and S4 in the structure shown in FIG. 17 each include the MOSFET or the wide bandgap device. In a low-power application scenario, switch-on voltage drops of the MOSFET and the wide bandgap device each are lower than a switch-on voltage drop of the IGBT. Therefore, selecting an appropriate MOSFET or wide bandgap device may further reduce a conduction loss. In addition, because a switch device loss is relatively large when a parasitic body diode of the MOSFET is switched off, connecting the MOSFET and the parasitic body diode in series can prevent a positive level from being output and prevent a current from flowing through the parasitic body diode of the MOSFET when the current flows from a direct current side to an alternating current side.

In conclusion, the embodiments of the present disclosure provide the converter and the method for driving the converter. In an actual working process of the converter, when the first switch device S1 and the fifth switch device S5 are switched on, that is, the output end O of the switch circuit is connected to the first end P of the direct current voltage source, the seventh switch device S7 may be controlled to be switched on. When the fourth switch device S4 and the sixth switch device S6 are switched on, that is, the output end O of the switch circuit is connected to the second end N of the direct current voltage source, the eighth switch device S8 may be controlled to be switched on. In this way; the switch-on voltage drop between the output end of the switch circuit and each of the two ends of the direct current voltage source may be a voltage drop of only one switch device, and the switch-on voltage drop is relatively small, thereby effectively reducing the conduction loss of the converter. In addition, the switching frequency of each switch device in the first switch unit is the power frequency, and the switching loss of the switch device is extremely low. The switch device in the third switch unit can be switched on and switched off at a low voltage or even a zero voltage, and the switching loss of the switch device is almost zero. Only the switch device with a low withstand voltage and a low switching loss in the second switch unit is switched on at the high frequency. Therefore, the switching loss of the entire switch circuit in the converter is also relatively low.

A person of ordinary skill in the art may understand that all or some of the steps of the foregoing driving method embodiments may be implemented by hardware or a program instructing related hardware. The program may be stored in a computer readable storage medium. The storage medium may be a read-only memory, a magnetic disc, an optical disc, or the like.

The foregoing descriptions are merely optional embodiments of this application, but are not intended to limit this application. Any modification, equivalent replacement, or improvement made without departing from the spirit and principle of this application shall fall within the protection scope of this application.

What is claimed is:

1. A converter, comprising:
a switch circuit comprising a first switch, a second switch, and a third switch; and
a filter,
wherein
a first end of the first switch is connected to a first end of a direct current voltage source, a second end of the first switch is connected to a second end of the direct current voltage source, and a third end of the first switch is connected to a third end of the direct current voltage source; the first switch comprises four switch devices that are sequentially connected in series: a first switch device, a second switch device, a third switch device, and a fourth switch device, wherein a first end of the first switch device is the first end of the first switch, a second end of the fourth switch device is the second end of the first switch, and a connection point between the second switch device and the third switch device is the third end of the first switch; and the first end, the second end, and the third end of the direct current voltage source are respectively configured to provide a positive level, a negative level, and a zero level;
a first end of the second switch is connected to a first connection point, and the first connection point is a connection point between the first switch device and the second switch device; a second end of the second switch is connected to a second connection point, and the second connection point is a connection point between the third switch device and the fourth switch device; a third end of the second switch is connected to an input end of the filter; and the second switch comprises a fifth switch device and a sixth switch device that are connected in series, wherein a first end of the fifth switch device is the first end of the second switch, a second end of the sixth switch device is the second end of the second switch, and a connection point between the fifth switch device and the sixth switch device is the third end of the second switch;
a first end of the third switch is connected to the first end of the direct current voltage source, a second end of the third switch is connected to the second end of the direct current voltage source, and a third end of the third switch is connected to the input end of the filter; and the third switch comprises a seventh switch device and an eighth switch device that are connected in series, wherein a first end of the seventh switch device is the first end of the third switch, a second end of the eighth switch device is the second end of the third switch, and a connection point between the seventh switch device and the eighth switch device is the third end of the third switch; and
a switching frequency of each switch device in the first switch is a power frequency, and a switching frequency of each switch device in the second switch is a high frequency; a switching frequency of the seventh switch device is a preset frequency in a switch-on phase of the first switch device, and the seventh switch device is in a switch-off state in a switch-off phase of the first switch device; and a switching frequency of the eighth switch device is the preset frequency in a switch-on phase of the second switch device, and the eighth switch device is in a switch-off state in a switch-off phase of the second switch device.

2. The converter of claim 1, wherein
each of the first switch device to the eighth switch device comprises an insulated gate bipolar transistor (IGBT) and a diode anti-parallel to the IGBT.

3. The converter of claim 1, wherein
each of the first switch device to the sixth switch device comprises an insulated gate bipolar transistor (IGBT) and a diode anti-parallel to the IGBT; and
the seventh switch device comprises an IGBT, and the eighth switch device comprises an IGBT.

4. The converter of claim 1, wherein
the first switch device comprises an insulated gate bipolar transistor (IGBT), and the fourth switch device comprises an IGBT; and
each of the switch devices other than the first switch device and the fourth switch device in the converter comprises an IGBT and a diode anti-parallel to the IGBT.

5. The converter of claim 1, wherein
each of the first switch device to the eighth switch device comprises a plurality of insulated gate bipolar transistors (IGBTs) that are connected in series, and each IGBT is anti-parallel to a diode.

6. The converter of claim 1, wherein
each of the first switch device to the sixth switch device comprises an insulated gate bipolar transistor (IGBT) and a diode anti-parallel to the IGBT;
each of the seventh switch device and the eighth switch device comprises a metal oxide semiconductor field effect transistor and a diode that are connected in series; or each of the seventh switch device and the eighth switch device comprises a wide bandgap device and a diode that are connected in series; or each of the seventh switch device and the eighth switch device comprises a wide bandgap device; and
the wide bandgap device comprises a gallium nitride device or a silicon carbide device.

7. The converter of claim 1, wherein
each of the first switch device and the fourth switch device comprises a metal oxide semiconductor field effect transistor and a diode that are connected in series; or each of the first switch device and the fourth switch device comprises a wide bandgap device and a diode that are connected in series; or each of the first switch device and the fourth switch device comprises a wide bandgap device; and the wide bandgap device comprises a gallium nitride device or a silicon carbide device; and
each of the switch devices other than the first switch device and the fourth switch device in the converter comprises an insulated gate bipolar transistor (IGBT) and a diode anti-parallel to the IGBT.

8. The converter of claim 1, wherein
a saturation voltage drop of each switch device in the first switch and the third switch is less than a preset voltage drop threshold, and a switching loss of each switch device in the second switch is less than a preset loss threshold.

9. The converter of claim 1, wherein
a withstand voltage of each switch device in the first switch and the second switch is not less than half of a direct current voltage provided by the direct current voltage source, and a withstand voltage of each switch device in the third switch is not less than the direct current voltage.

10. The converter of claim 1, wherein the converter further comprises;
a control module, wherein the control module is connected to a control end of each switch device and is configured to output a drive signal to each switch device.

11. The converter of claim 10, wherein a frequency of a drive signal output by the control module to each switch device in the first switch is the power frequency, and each power frequency period comprises a first drive phase and a second drive phase;
in the first drive phase, a level of a first drive signal output by the control module to the first switch device and a level of a third drive signal output to the third switch device each are a first level; a level of a second drive signal output by the control module to the second switch device and a level of a fourth drive signal output to the fourth switch device each are a second level; a frequency of a fifth drive signal output by the control module to the fifth switch device and a frequency of a sixth drive signal output to the sixth switch device each are the high frequency, and the fifth drive signal and the sixth drive signal are complementary to each other; a frequency of a seventh drive signal output by the control module to the seventh switch device is the preset frequency; and a level of an eighth drive signal output to the eighth switch device is the second level; and in at least one high frequency period, when the fifth drive signal jumps from the second level to the first level, the seventh drive signal jumps from the second level to the first level at the same time or jumps from the second level to the first level after a preset time period, and the seventh drive signal jumps from the first level to the second level before the fifth drive signal jumps from the first level to the second level; and
in the second drive phase, the level of the first drive signal and the level of the third drive signal each are the second level; the level of the second drive signal and the level of the fourth drive signal each are the first level; the frequency of the fifth drive signal and the frequency of the sixth drive signal each are the high frequency, and the fifth drive signal and the sixth drive signal are complementary to each other; the level of the seventh drive signal is the second level; and a frequency of the eighth drive signal is the preset frequency; and in at least one high frequency period, when the sixth drive signal jumps from the second level to the first level, the eighth drive signal jumps from the second level to the first level at the same time or jumps from the second level to the first level after a preset time period, and the eighth drive signal jumps from the first level to the second level before the sixth drive signal jumps from the first level to the second level.

12. A method for driving a converter, wherein the converter comprises a switch circuit comprising a first switch, a second switch, and a third switch; and a filter, wherein a first end of the first switch is connected to a first end of a direct current voltage source, a second end of the first switch is connected to a second end of the direct current voltage source, and a third end of the first switch is connected to a third end of the direct current voltage source; the first switch comprises four switch devices that are sequentially connected in series: a first switch device, a second switch device, a third switch device, and a fourth switch device, wherein a first end of the first switch device is the first end of the first switch, a second end of the fourth switch device is the second end of the first switch, and a connection point between the second switch device and the third switch device is the third end of the first switch; and the first end, the second end, and the third end of the direct current voltage source are respectively configured to provide a positive level, a negative level, and a zero level; a first end of the second switch is connected to a first connection point, and the first connection point is a connection point between the first switch device and the second switch device; a second end of the second switch is connected to a second connection point, and the second connection point is a connection point between the third switch device and the fourth switch device; a third end of the second switch is connected to an input end of the filter; and the second switch comprises a fifth switch device and a sixth switch device that are connected in series, wherein a first end of the fifth switch device is the first end of the second switch, a second end of the sixth switch device is the second end of the second switch, and a connection point between the fifth switch device and the sixth switch device is the third end of the second switch; a first end of the third switch is connected to the first end of the direct current voltage source, a second end of the third switch is connected to the second end of the direct current voltage source, and a third end of the third switch is connected to the input end of the filter; and the third switch comprises a seventh switch device and an eighth switch device that are connected in series, wherein a first end of the seventh switch device is the first end of the third switch, a second end of the eighth switch device is the second end of the third switch, and a connection point between the seventh switch device and the eighth switch device is the third end of the third switch; and a switching frequency of each switch device in the first switch is a power frequency, and a switching frequency of each switch device in the second switch is a high frequency; a switching frequency of the seventh switch device is a preset frequency in a switch-on phase of the first switch device, and the seventh switch device is in a switch-off state in a switch-off phase of the first switch device; and a switching frequency of the eighth switch device is the preset frequency in a switch-on phase of the second switch device, and the eighth switch device is in a switch-off state in a switch-off phase of the second switch device;
the method comprising:
in a first drive phase, switching on the first switch device and the third switch device in the first switch; switching off the second switch device and the fourth switch device in the first switch; switching on and switching off each of the fifth switch device and the sixth switch device in the second switch at a high frequency, and alternately switching on the fifth switch device and the sixth switch device; switching on and switching off the seventh switch device in the third switch at a preset frequency; and switching off the eighth switch device in the third switch, wherein in at least one switch-on period of the fifth switch device, the seventh switch device and the fifth switch device are switched on at the same time, or the seventh switch device is switched on after a preset time period, and the seventh switch device is switched off before the fifth switch device is switched off; when the fifth switch device is switched on, the first end of the direct current voltage source is connected to the input end of the filter; and when the sixth switch device is switched on, the third end of the direct current voltage source is connected to the input end of the filter; and in a second drive phase, switching off the first switch device and the third switch device in the first switch; switching on the second switch device and the fourth switch device in the first switch; switching on and switching off the fifth switch device and the sixth switch device in the second switch at the high frequency, and alternately switching on the fifth switch device and the sixth switch device; switching on and switching off the eighth switch device in the third switch at the preset frequency; and switching off the seventh switch device in the third switch, wherein in at least one switch-on period of the sixth switch device, the eighth switch device and the sixth switch device are switched on at the same time, or the eighth switch device is switched on after a preset time period, and the eighth switch device is switched off before the sixth switch device is switched off; when the sixth switch device is switched on, the second end of the direct current voltage source is connected to the input end of the filter; and when the fifth switch device is switched on, the third end of the direct current voltage source is connected to the input end of the filter.

13. The method of claim 12, wherein each of the first switch device to the eighth switch device comprises an insulated gate bipolar transistor (IGBT) and a diode anti-parallel to the IGBT;

in the first drive phase, the IGBTs in the first switch device and the third switch device are switched on; when the IGBTs in the fifth switch device and the seventh switch device both are switched on, the first end of the direct current voltage source is connected to the input end of the filter using the seventh switch device; and when the IGBT in the sixth switch device is switched on, the third end of the direct current voltage source is connected to the input end of the filter; and in the second drive phase, the IGBTs in the second switch device and the fourth switch device are switched on; when the IGBTs in the sixth switch device and the eighth switch device both are switched on, the second end of the direct current voltage source is connected to the input end of the filter using the eighth switch device; and when the IGBT in the fifth switch device is switched on, the third end of the direct current voltage source is connected to the input end of the filter.

* * * * *